US009307444B2

(12) United States Patent
Wang et al.

(10) Patent No.: US 9,307,444 B2
(45) Date of Patent: Apr. 5, 2016

(54) SIGNALING DATA COMPRESSION/DECOMPRESSION DEVICES AND METHODS FOR WIRELESS COMMUNICATION NETWORKS

(71) Applicant: Agency for Science, Technology and Research, Singapore (SG)

(72) Inventors: Haiguang Wang, Singapore (SG); Shoukang Zheng, Singapore (SG); Jaya Shankar Pathmasuntharam, Singapore (SG); Rongshan Yu, Singapore (SG); Wai Leong Yeow, Singapore (SG); Ser Wah Oh, Singapore (SG); Anh Tuan Hoang, Singapore (SG); Chee Ming Joseph Teo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/357,412

(22) PCT Filed: Nov. 9, 2012

(86) PCT No.: PCT/SG2012/000427
§ 371 (c)(1),
(2) Date: May 9, 2014

(87) PCT Pub. No.: WO2013/070174
PCT Pub. Date: May 16, 2013

(65) Prior Publication Data
US 2014/0269317 A1    Sep. 18, 2014

(30) Foreign Application Priority Data

Nov. 9, 2011    (SG) .............................. 201108262-5

(51) Int. Cl.
*H04W 28/06*    (2009.01)
*H04L 29/06*    (2006.01)
*H04W 52/02*    (2009.01)

(52) U.S. Cl.
CPC ............... *H04W 28/06* (2013.01); *H04L 69/04* (2013.01); *H04W 52/02* (2013.01); *H04W 52/0216* (2013.01)

(58) Field of Classification Search
CPC . H04W 28/06; H04W 52/02; H04W 52/0216; H04L 69/04
USPC .................................................. 370/235, 328
See application file for complete search history.

(56) References Cited

U.S. PATENT DOCUMENTS

| 5,955,976 A | 9/1999 | Heath |
|---|---|---|
| 2005/0124294 A1 | 6/2005 | Wentlink |

(Continued)

FOREIGN PATENT DOCUMENTS

| CA | EP1684465 A1 | * | 7/2006 |
|---|---|---|---|
| WO | WO/2013/066363 | * | 10/2013 |

OTHER PUBLICATIONS

Park, Proposed Specification Framework for TGah, Jan. 19, 2012, IEEE 802.11-11/1137r5.*

(Continued)

*Primary Examiner* — Chi H Pham
*Assistant Examiner* — Shailendra Kumar
(74) *Attorney, Agent, or Firm* — Blakely, Sokoloff, Taylor & Zafman LLP

(57) ABSTRACT

A compression device which may include: a subset determination circuit configured to determine a subset of a traffic indication map, the traffic indication map including a plurality of bits, each bit indicating whether data to be transmitted to a respective pre-determined radio communication terminal is present in an access point; a pre-determined bit value determination circuit configured to determine whether the subset includes a bit of a pre-determined bit value; and a compressed string generation circuit configured to insert, if the subset includes a bit of the pre-determined bit value, into a compressed string the subset and an indicator indicating that the subset includes a bit of the pre-determined bit value, and further configured to include, if the subset does not includes a bit of the pre-determined bit value, into the compressed string an indicator indicating that the subset does not include a bit of the pre-determined bit value.

12 Claims, 11 Drawing Sheets

(56) References Cited

U.S. PATENT DOCUMENTS

| | | | | |
|---|---|---|---|---|
| 2005/0276237 | A1* | 12/2005 | Segal | H04L 12/12 370/312 |
| 2008/0146253 | A1* | 6/2008 | Wentink | H04W 52/0216 455/458 |
| 2008/0279138 | A1 | 11/2008 | Gonikberg et al. | |
| 2009/0016306 | A1* | 1/2009 | Wang et al. | 370/338 |
| 2011/0161357 | A1* | 6/2011 | Kataoka et al. | 707/769 |
| 2015/0029933 | A1* | 1/2015 | Park | H04W 68/005 370/328 |

OTHER PUBLICATIONS

PCT Notification of Transmittal of the International Search Report and the Written Opinion of the International Searching Authority, or the Declaration for PCT Counterpart Application No. PCT/SG2012/000427 Containing International Search Report, 10 pages (Jan. 22, 2013).

IEEE Computer Society, "IEEE Standard for Information technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Std 802.11-2007, 1232 pgs., (Jun. 12, 2007).

Dwight Smith, "Device Collectives to Share Resources", IEEE 802.11-11/0779r0, 8 pgs., (May 11, 2011).

Chao-Chun Wang, et al., "Supporting Large Number of STAs in 802.11ah", IEEE 802.11-11/0725r0, 7 pgs., (May 9, 2011).

Jonghyun Park, "Station Group Management for 802.11ah", IEEE 802.11-11/0762r0, 9 pgs., (May 10, 2011).

Byeongwoo Kang, et al., "Association ID management for TGah", IEEE 802.11-11/0088r1, 7 pgs., (Jan. 16, 2011).

Rolf De Vegt, "Potential Compromise for 802.11ah Use Case Document", IEEE 802.11-11/0457r0, 27 pgs., (Mar. 17, 2011).

Solomon W. Golomb, "Run-Length Encodings", IEEE Transactions on Information Theory, vol. IT-12, No. 3, pp. 399-401, (Jul. 1966).

Jacob Ziv, et al., "A Universal Algorithm for Sequential Data Compression", IEEE Transactions on Information Theory, vol. IT-23, No. 3, pp. 337-343, (May 1977).

IEEE Computer Society, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 8: IEEE 802.11 Wireless Network Management", IEEE Std 802.11v-2011, 433 pgs., (Feb. 9, 2011).

Menzo Wentink, et al., "Low Power Medium Access", IEEE 802.11-12/0114r0, 13 pgs., (Jan. 16, 2012).

Santosh Abraham, et al., "Short Beacon", IEEE 802.11-12/0129r1, 14 pgs., (Jan. 2012).

Minyoung Park, et al., "TGah TIM Operation", IEEE 802.11-12/117r0, 10 pgs., (Jan. 16, 2012).

Liwen Chu, et al., "TGah Power Saving", IEEE 802.11-12/0102r2, 9 pgs., (Jan. 16, 2012).

Minho Cheong, "TGah Functional Requirements and Evaluation Methodology Rev. 4", IEEE 802.11-11/0905r4, 20 pgs., (Sep. 21, 2011).

Chao-Chun Wang, et al., "Supporting Large Number of STAs in 802.11ah", IEEE 802.11-11/1019r1, 8 pgs., (Jul. 20, 2011).

Singapore Patent Application No. 201106746-9, "Asymmetrical Cellular-WiFi Offload Method with Long Range WiFi Networks", 12 pgs., (Sep. 9, 2011).

PCT Notification Concerning Transmittal of International Preliminary Report on Patentability (Chapter I of the Patent Cooperation Treaty) for PCT Counterpart Application No. PCT/SG2012/000427, 6 pp., (May 22, 2014).

Minyoung Park, "Proposed Specification Framework for TGah", IEEE 802.11-11/1137r5, 12 pgs., (Jan. 19, 2012).

* cited by examiner

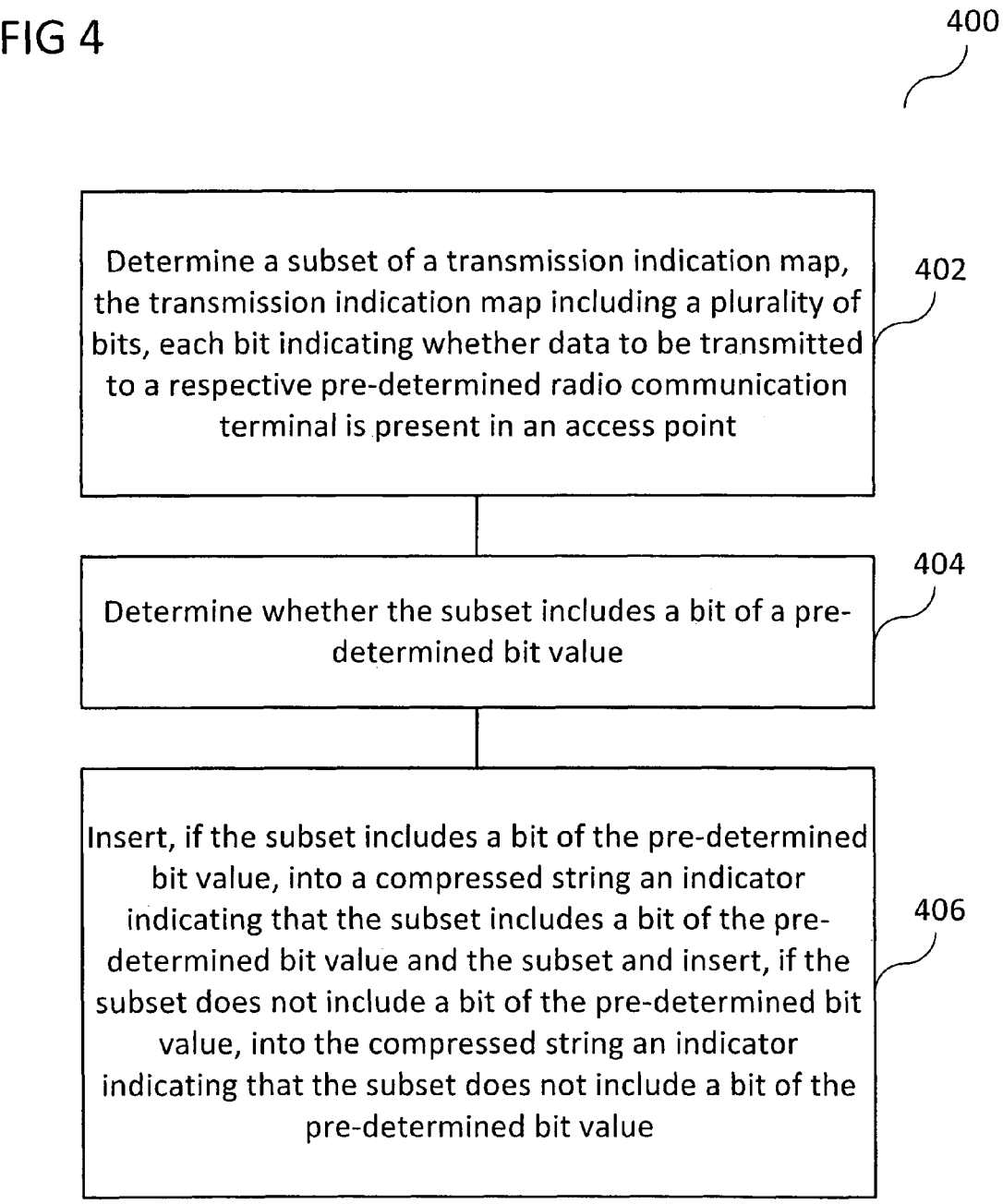

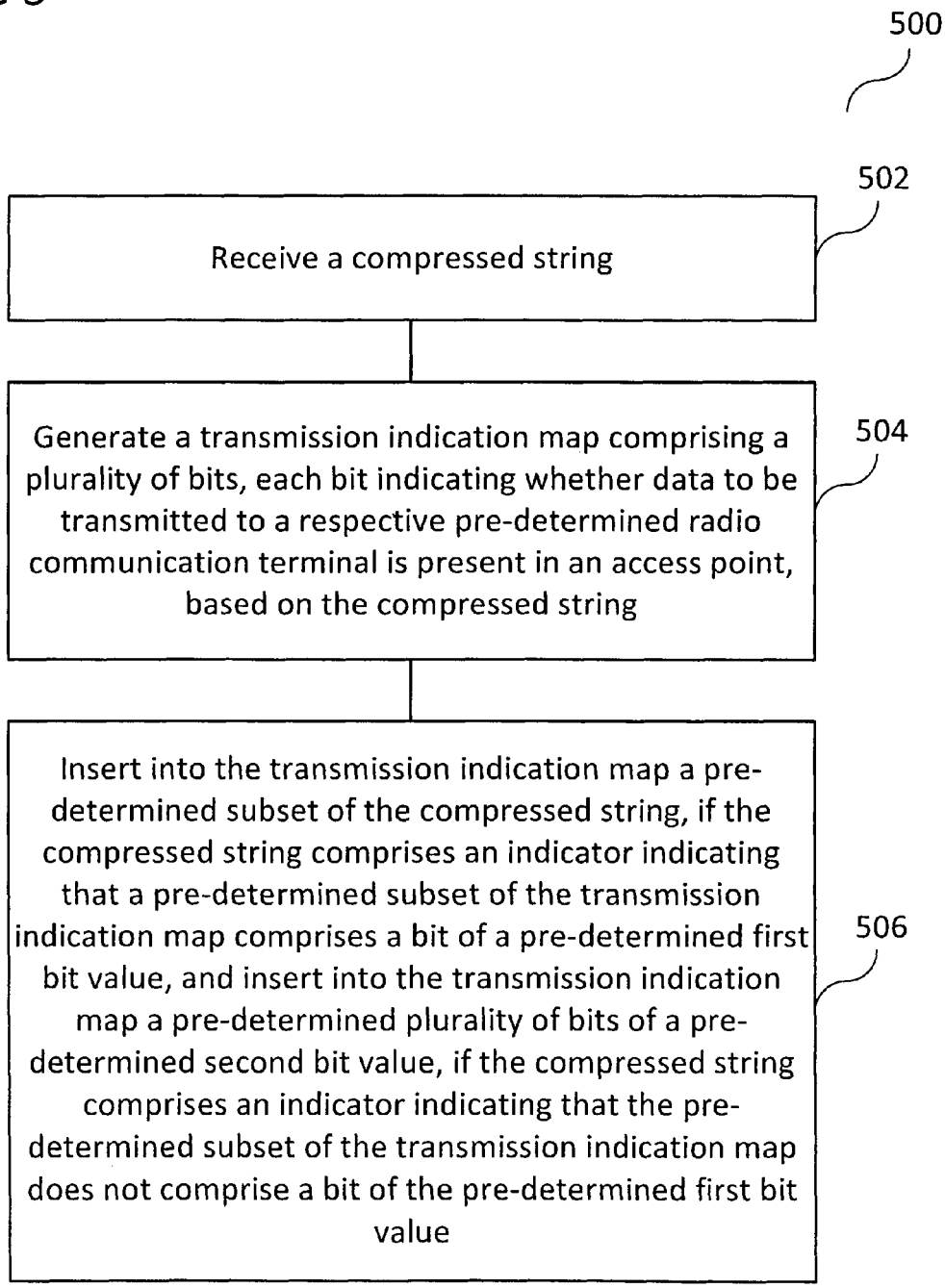

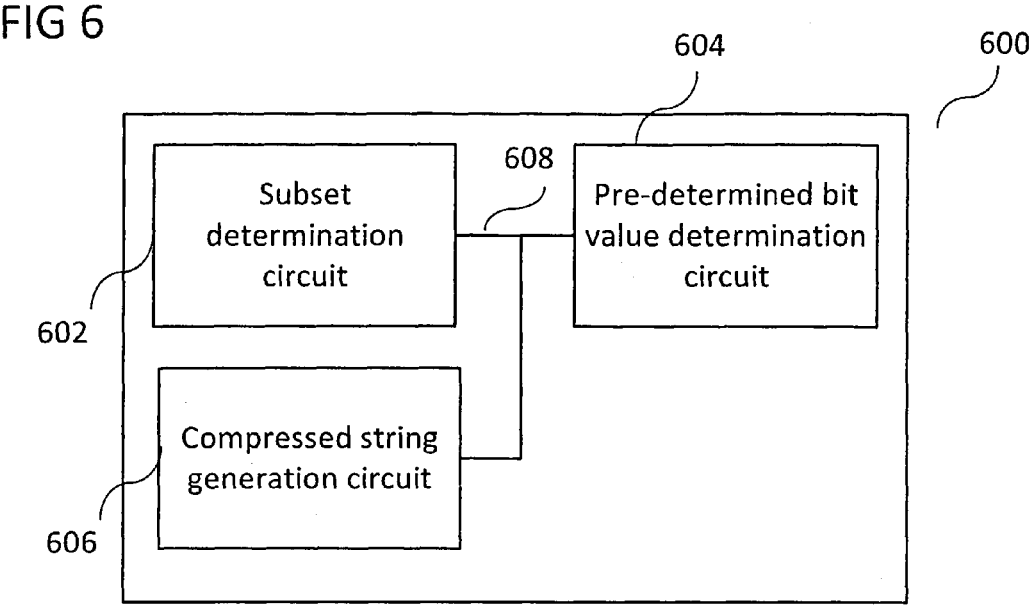
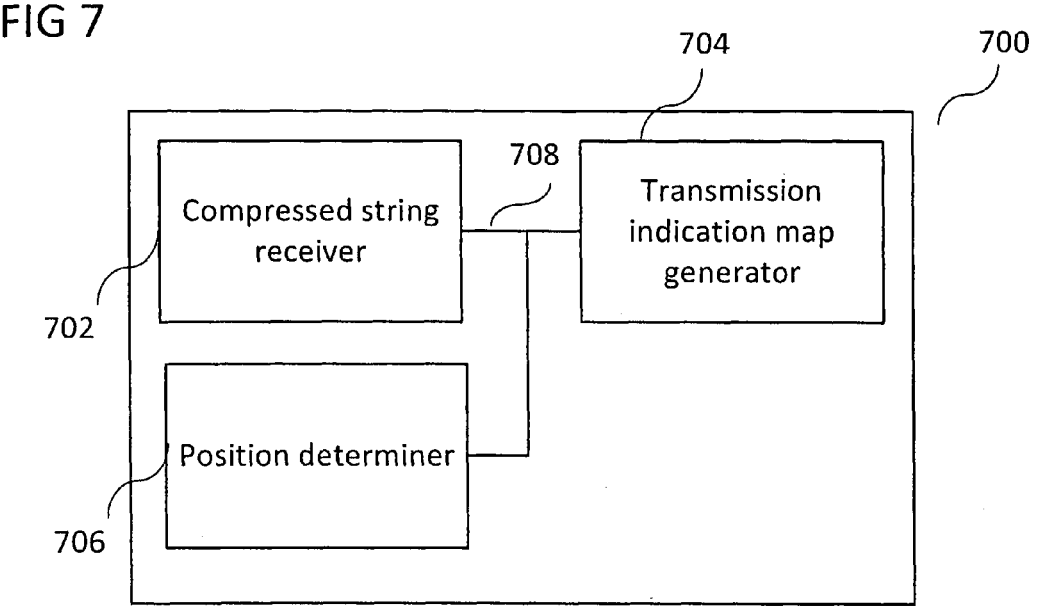

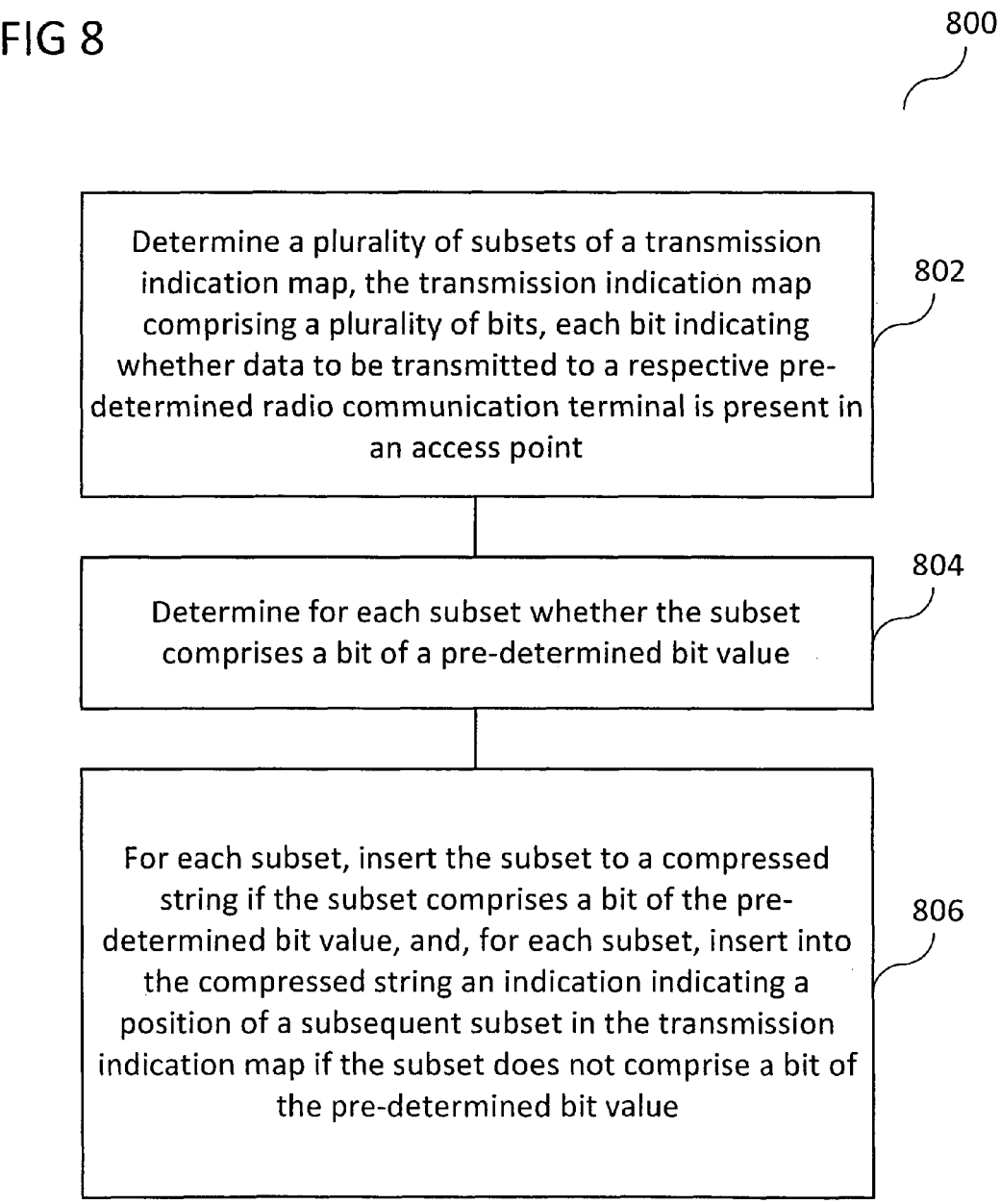

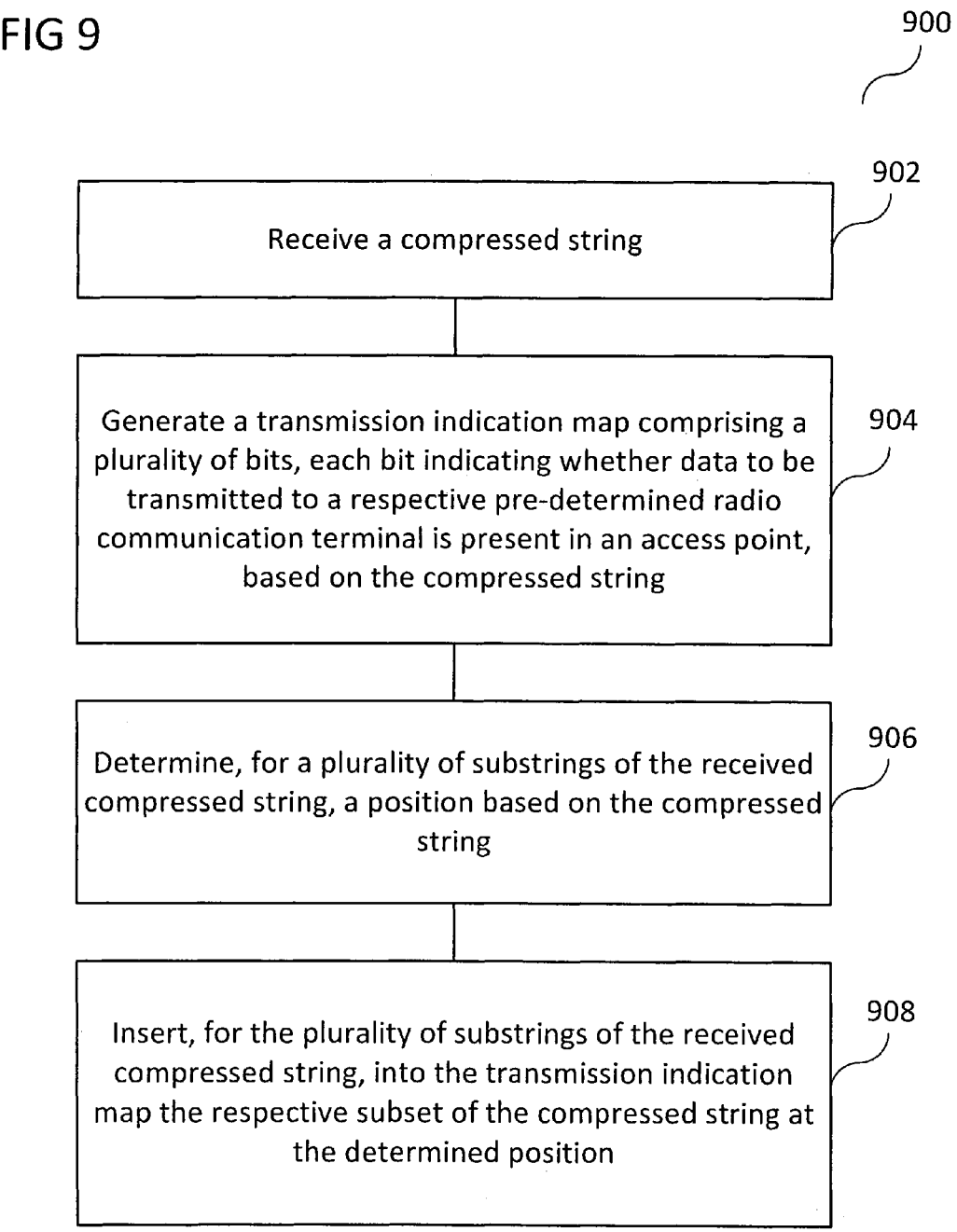

SIGNALING DATA COMPRESSION/DECOMPRESSION DEVICES AND METHODS FOR WIRELESS COMMUNICATION NETWORKS

CROSS-REFERENCE TO RELATED APPLICATIONS

This patent application is a U.S. National Phase application under 35 U.S.C. §371 of International Application No. PCT/SG2012/000427, filed Nov. 9, 2012, entitled COMPRESSION DEVICES, DECOMPRESSION DEVICES, COMPRESSION METHODS, AND DECOMPRESSION METHODS, which claims the benefit of the Singapore patent application No. 201108262-5, filed on Nov. 9, 2011, the entire contents of which were incorporated by reference in their entirety for all purposes.

TECHNICAL FIELD

Embodiments relate generally to compression devices, decompression devices, compression methods, and decompression methods.

BACKGROUND

An access point may communicate with a mobile station. The access point may indicate to the mobile station whether it has data for the mobile station. A problem may arise if an access point communicates with a large number of mobile stations.

SUMMARY

According to various embodiments, a compression device may be provided. The compression device may include: a subset determination circuit configured to determine a subset of a transmission indication map, the transmission indication map including a plurality of bits, each bit indicating whether data to be transmitted to a respective pre-determined radio communication terminal is present in an access point; a pre-determined bit value determination circuit configured to determine whether the subset includes a bit of a pre-determined bit value; and a compressed string generation circuit configured to insert, if the subset includes a bit of the pre-determined bit value, into a compressed string an indicator indicating that the subset includes a bit of the pre-determined bit value and the subset and further configured to insert, if the subset does not includes a bit of the pre-determined bit value, into the compressed string an indicator indicating that the subset does not include a bit of the pre-determined bit value.

A decompression device may be provided. The decompression device may include: a compressed string receiver configured to receive a compressed string; and a transmission indication map generator configured to generate a transmission indication map including a plurality of bits, each bit indicating whether data to be transmitted to a respective pre-determined radio communication terminal is present in an access point, based on the compressed string. The transmission indication map generator may be configured to insert into the transmission indication map a pre-determined subset of the compressed string, if the compressed string includes an indicator indicating that a pre-determined subset of the transmission indication map includes a bit of a pre-determined first bit value, and further configured to insert into the transmission indication map a pre-determined plurality of bits of a pre-determined second bit value, if the compressed string includes an indicator indicating that the pre-determined subset of the transmission indication map does not include a bit of the pre-determined first bit value.

A compression method may be provided. The compression method may include: determining a subset of a transmission indication map, the transmission indication map including a plurality of bits, each bit indicating whether data to be transmitted to a respective pre-determined radio communication terminal is present in an access point; determining whether the subset includes a bit of a pre-determined bit value; and inserting, if the subset includes a bit of the pre-determined bit value, into a compressed string an indicator indicating that the subset includes a bit of the pre-determined bit value and the subset and inserting, if the subset does not include a bit of the pre-determined bit value, into the compressed string an indicator indicating that the subset does not include a bit of the pre-determined bit value.

A decompression method may be provided. The decompression method may include: receiving a compressed string; generating a transmission indication map including a plurality of bits, each bit indicating whether data to be transmitted to a respective pre-determined radio communication terminal is present in an access point, based on the compressed string; and inserting into the transmission indication map a pre-determined subset of the compressed string, if the compressed string includes an indicator indicating that a pre-determined subset of the transmission indication map includes a bit of a pre-determined first bit value, and inserting into the transmission indication map a pre-determined plurality of bits of a pre-determined second bit value, if the compressed string includes an indicator indicating that the pre-determined subset of the transmission indication map does not include a bit of the pre-determined first bit value.

A compression device may be provided. The compression device may include: a subset determination circuit configured to determine a plurality of subsets of a transmission indication map, the transmission indication map including a plurality of bits, each bit indicating whether data to be transmitted to a respective pre-determined radio communication terminal is present in an access point; a pre-determined bit value determination circuit configured to determine for each subset whether the subset includes a bit of a pre-determined bit value; and a compressed string generation circuit configured to, for each subset, insert the subset to a compressed string if the subset includes a bit of the pre-determined bit value, and further configured to, for each subset, insert into the compressed string an indication indicating a position of a subsequent subset in the transmission indication map if the subset does not include a bit of the pre-determined bit value.

A decompression device may be provided. The decompression device may include: a compressed string receiver configured to receive a compressed string; a transmission indication map generator configured to generate a transmission indication map including a plurality of bits, each bit indicating whether data to be transmitted to a respective pre-determined radio communication terminal is present in an access point, based on the compressed string, a position determiner configured to determine, for a plurality of substrings of the received compressed string, a position based on the compressed string. The transmission indication map generator may be configured to insert, for the plurality of substrings of the received compressed string, into the transmission indication map the respective subset of the compressed string at the determined position.

A compression method may be provided. The compression methods may include: determining a plurality of subsets of a transmission indication map, the transmission indication map including a plurality of bits, each bit indicating whether data to be transmitted to a respective pre-determined radio communication terminal is present in an access point; determining for each subset whether the subset includes a bit of a pre-determined bit value; and for each subset, inserting the subset to a compressed string if the subset includes a bit of the pre-determined bit value, and further configured to, for each subset, insert into the compressed string an indication indicating a position of a subsequent subset in the transmission indication map if the subset does not include a bit of the pre-determined bit value.

A decompression method may be provided. The decompression methods may include: receiving a compressed string; generating a transmission indication map including a plurality of bits, each bit indicating whether data to be transmitted to a respective pre-determined radio communication terminal is present in an access point, based on the compressed string; determining, for a plurality of substrings of the received compressed string, a position based on the compressed string; and inserting, for the plurality of substrings of the received compressed string, into the transmission indication map the respective subset of the compressed string at the determined position.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 4 shows a flow diagram illustrating a compression method according to various embodiments;

FIG. 5 shows a flow diagram illustrating a decompression method according to various embodiments;

FIG. 6 shows a compression device according to various embodiments;

FIG. 7 shows a decompression device according to various embodiments;

FIG. 8 shows a flow diagram illustrating a compression method according to various embodiments;

FIG. 9 shows a flow diagram illustrating a decompression method according to various embodiments;

DESCRIPTION

Embodiments described below in context of the devices are analogously valid for the respective methods, and vice versa. Furthermore, it will be understood that the embodiments described below may be combined, for example, a part of one embodiment may be combined with a part of another embodiment.

In this context, the compression device as described in this description may include a memory which is for example used in the processing carried out in the compression device. In this context, the decompression device as described in this description may include a memory which is for example used in the processing carried out in the decompression device. In this context, the radio communication terminal as described in this description may include a memory which is for example used in the processing carried out in the radio communication terminal. In this context, the access point as described in this description may include a memory which is for example used in the processing carried out in the access point. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

A compression device may be provided in an access point. A decompression device may be provided in a mobile station.

In this context, a radio communication terminal may be a mobile radio communication device, like a mobile phone, a user equipment (UE), or a mobile station, or a client. An access point may be for example a wireless access point, for example a wireless local area network access point or a metropolitan area access point. An access point (AP) may be for example a WiFi AP, a WLAN AP, or a metropolitan area system AP.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Figure 1:
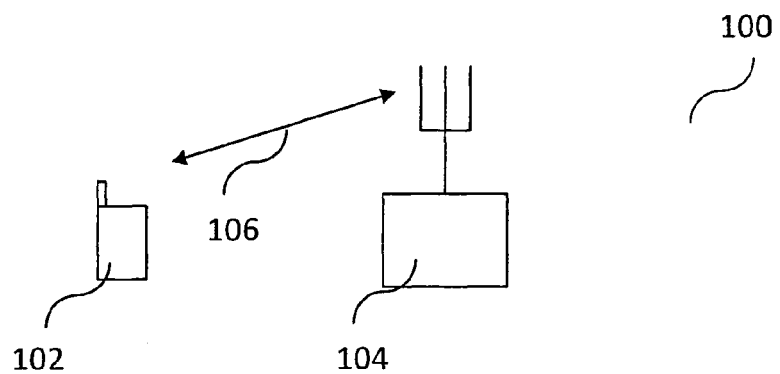
FIG. 1 shows a radio communication system in accordance with an embodiment.

FIG. 1 shows a mobile radio communication system 100. A radio communication terminal 102 (for example a mobile station, for example referred to by STA) may communicate with an access point 104. The access point 104 may indicate to the station 102 when it has data for the station 102.

Figure 2:
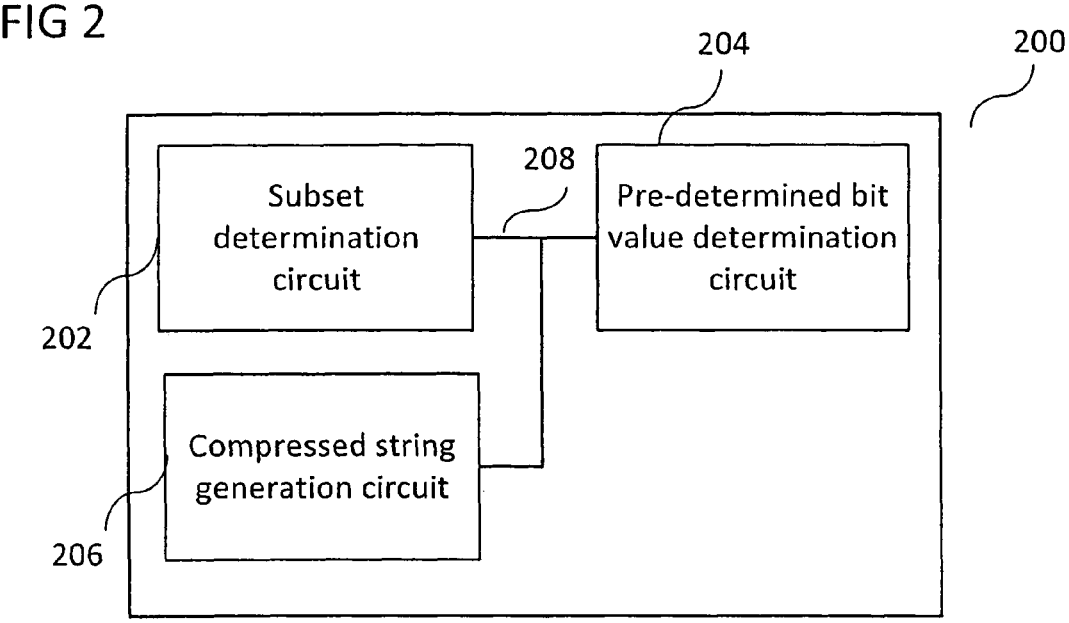
FIG. 2 shows a compression device according to various embodiments.

FIG. 2 shows a compression device 200 according to various embodiments. The compression device 200 may include a subset determination circuit 202 configured to determine a subset of a transmission indication map. The transmission indication map may include a plurality of bits. Each bit may indicate whether data to be transmitted to a respective pre-determined radio communication terminal is present in an access point. The compression device 200 may further include a pre-determined bit value determination circuit 204 configured to determine whether the subset includes a bit of a pre-determined bit value (for example, whether the subset includes a bit of a pre-determined bit value at a pre-determined position in the subset). The compression device 200 may further include a compressed string generation circuit 206 configured to insert, if the subset includes a bit of the pre-determined bit value, into a compressed string an indicator indicating that the subset includes a bit of the pre-determined bit value and the subset. The compressed string generation circuit may further be configured to insert, if the subset does not include a bit of the pre-determined bit value, into the compressed string an indicator indicating that the subset does not include a bit of the pre-determined bit value. The subset determination circuit 202, the pre-determined bit value determination circuit 204, and the compressed string generation circuit 206 may be coupled with each other, for example by a coupling 208, for example an electrical coupling or optical coupling, like an electrical line or an optical line, or any other device configured to transmit electrical signals or optical signals, for example a cable.

According to various embodiments, the pre-determined bit value determination circuit 204 may further be configured to determine whether the subset includes a plurality of bits following a pre-determined pattern.

According to various embodiments, the pre-determined pattern may be determined at the Access Point by default, for example a plurality of bits which doesn't include a bit of a pre-determined bit value (e.g. one). According to various embodiments, the pre-determined pattern may be determined at the Access Point by defining the pattern as a plurality of bits containing (only) a fixed number of bits whose bit values are pre-determined.

One example may be that for each 4-bit substring "0101", 0 may be used as the indicator; for each 4-bit non-"0101" substring, 1 may be used as the indicator.

Another example may be that for each 4-bit substring without containing the bit "1", 0 may be used as the indicator; and for each 4-bit substring containing the bit "1", 1 may be used as the indicator.

According to various embodiments, the pre-determined bit value may be one.

According to various embodiments, the indicator indicating that the subset includes a bit of the pre-determined bit value may include or may be a bit of a pre-determined first bit value. The indicator indicating that the subset does not include a bit of the pre-determined bit value may include or may be a bit of a pre-determined second bit value.

According to various embodiments, the pre-determined first bit value may be one and the pre-determined second bit value may be zero.

According to various embodiments, the compression device 2000 may further be configured to perform compression of the indicators using the subset determination circuit 202, the pre-determined bit value determination circuit 204, and the compressed string generation circuit 206.

According to various embodiments, the compression device 200 may further be configured to process a plurality of subsets of the transmission indication map using the subset determination circuit 202, the pre-determined bit value determination circuit 204, and the compressed string generation circuit 206.

According to various embodiments, the compressed string generation circuit 206 may be configured to insert into the compressed string only an indicator indicating that the subset does not include a bit of the pre-determined bit value, if the subset does not include a bit of the pre-determined bit value.

According to various embodiments, the compressed string generation circuit 206 may be configured to not insert into the compressed string the subset, if the subset does not include a bit of the pre-determined bit value.

According to various embodiments, the compressed string generation circuit 206 may be configured generate the compressed string free of the subset, if the subset does not include a bit of the pre-determined bit value.

Figure 3:
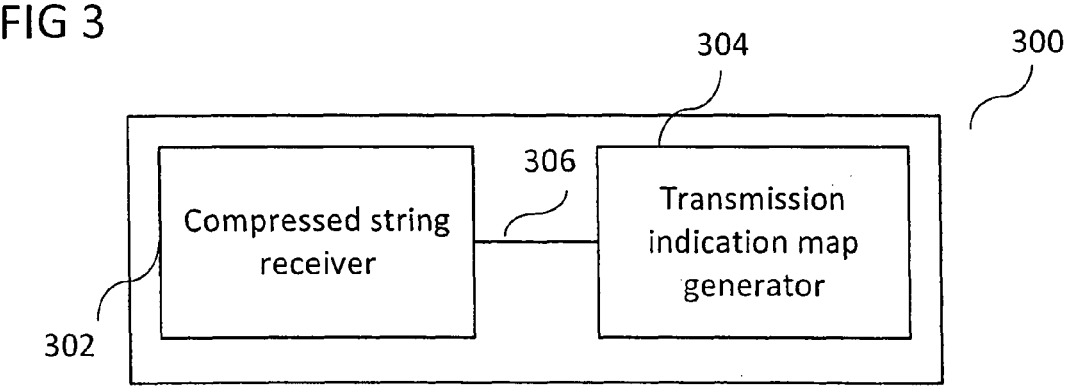
FIG. 3 shows a decompression device according to various embodiments.

FIG. 3 shows a decompression device 300 according to various embodiments. The decompression device 300 may include a compressed string receiver 302 configured to receive a compressed string. The decompression device 300 may further include a transmission indication map generator 304 configured to generate a transmission indication map based on the compressed string. The transmission indication map may include a plurality of bits. Each bit may indicate whether data to be transmitted to a respective pre-determined radio communication terminal is present in an access point. The transmission indication map generator 304 may be configured to insert into the transmission indication map a pre-determined subset of the compressed string, if the compressed string includes an indicator indicating that a pre-determined subset of the transmission indication map includes a bit of a pre-determined first bit value (for example, that the pre-determined subset includes a bit of a pre-determined bit value at a pre-determined position in the subset). The transmission indication map generator 304 may further be configured to include into the transmission indication map a pre-determined plurality of bits of a pre-determined second bit value, if the compressed string includes an indicator indicating that the pre-determined subset of the transmission indication map does not include a bit of the pre-determined first bit value. The compressed string receiver 302 and the transmission indication map generator 304 may be coupled with each other, for example by a coupling 306, for example an electrical coupling or optical coupling, like an electrical line or an optical line, or any other device configured to transmit electrical signals or optical signals, for example a cable.

According to various embodiments, the indicator indicating that the subset includes a bit of the pre-determined bit value may include or may be a bit of a pre-determined first bit value. The indicator indicating that the subset does not include a bit of the pre-determined bit value may include or may be a bit of a pre-determined second bit value.

According to various embodiments, the pre-determined first bit value may be one and the pre-determined second bit value may be zero.

FIG. 4 shows a flow diagram 400 illustrating a compression method according to various embodiments. In 402, a subset of a transmission indication map may be determined. The transmission indication map may include a plurality of bits. Each bit may indicate whether data to be transmitted to a respective pre-determined radio communication terminal is present in an access point. In 404, it may be determined whether the subset includes a bit of a pre-determined bit value (for example, whether the subset includes a bit of a pre-determined bit value at a pre-determined position in the subset). In 406, if the subset includes a bit of the pre-determined bit value, an indicator indicating that the subset includes a bit of the pre-determined bit value and the subset may be inserted into a compressed string, and, if the subset does not include a bit of the pre-determined bit value, an indicator indicating that the subset does not include a bit of the pre-determined bit value may be inserted into the compressed string.

According to various embodiments, the method may further include determining whether the subset includes a plurality of bits following a pre-determined pattern.

According to various embodiments, the pre-determined bit value may be one.

According to various embodiments, the indicator indicating that the subset includes a bit of the pre-determined bit value may include or may be a bit of a pre-determined first bit value. The indicator indicating that the subset does not include a bit of the pre-determined bit value may include or may be a bit of a pre-determined second bit value.

According to various embodiments, the pre-determined first bit value may be one and the pre-determined second bit value may be zero.

According to various embodiments, the method may further include performing compression of the indicators using the subset determination, the pre-determined bit value determination, and the compressed string generation.

According to various embodiments, the method may further include processing a plurality of subsets of the transmission indication map using the subset determination, the pre-determined bit value determination, and the compressed string generation.

According to various embodiments, the method may further include inserting into the compressed string only an indicator indicating that the subset does not include a bit of the pre-determined bit value, if the subset does not include a bit of the pre-determined bit value.

According to various embodiments, the method may further include not inserting into the compressed string the subset, if the subset does not include a bit of the pre-determined bit value.

According to various embodiments, the method may further include generating the compressed string free of the subset, if the subset does not include a bit of the pre-determined bit value.

FIG. 5 shows a flow diagram 500 illustrating a decompression method according to various embodiments. In 502, a compressed string may be received. In 504, a transmission indication map including a plurality of bits may be generated based on the compressed string. Each bit may indicate whether data to be transmitted to a respective pre-determined radio communication terminal is present in an access point. In 506, a pre-determined subset of the compressed string may be inserted into the transmission indication map, if the compressed string includes an indicator indicating that a pre-determined subset of the transmission indication map includes a bit of a pre-determined first bit value (for example at a pre-determined position in the subset), and a pre-determined plurality of bits of a pre-determined second bit value may be inserted into the transmission indication map, if the compressed string includes an indicator indicating that the pre-determined subset of the transmission indication map does not includes a bit of the pre-determined first bit value (for example at the pre-determined position in the subset).

According to various embodiments, the indicator indicating that the subset includes a bit of the pre-determined bit value may include or may be a bit of a pre-determined first bit value. The indicator indicating that the subset does not include a bit of the pre-determined bit value includes a bit of a pre-determined second bit value.

According to various embodiments, the pre-determined first bit value may be one and the pre-determined second bit value may be zero.

FIG. 6 shows a compression device 600 according to various embodiments. The compression device 600 may include a subset determination circuit 602 configured to determine a plurality of subsets of a transmission indication map. The transmission indication map may include a plurality of bits. Each bit may indicate whether data to be transmitted to a respective pre-determined radio communication terminal is present in an access point. The compression device 600 may further include a pre-determined bit value determination circuit 604 configured to determine for each subset whether the subset includes a bit of a pre-determined bit value. The compression device 600 may further include a compressed string generation circuit 606 configured to, for each subset, insert the subset to a compressed string if the subset includes a bit of the pre-determined bit value, and further configured to, for each subset, insert into the compressed string an indication indicating a position of a subsequent subset in the transmission indication map if the subset does not include a bit of the pre-determined bit value. The subset determination circuit 602, the pre-determined bit value determination circuit 604, and the compressed string generation circuit 606 may be coupled with each other, for example by a coupling 608, for example an electrical coupling or optical coupling, like an electrical line or an optical line, or any other device configured to transmit electrical signals or optical signals, for example a cable.

According to various embodiments, the indication may include or may be an absolute position in the transmission indication map.

According to various embodiments, the indication may include or may be a relative position in the transmission indication map with respect to a preceding position.

According to various embodiments, the pre-determined first bit value may be one and the pre-determined second bit value may be zero.

FIG. 7 shows a decompression device 700 according to various embodiments. The decompression device 700 may include a compressed string receiver 702 configured to receive a compressed string. The decompression device 700 may further include a transmission indication map generator 704 configured to generate a transmission indication map including a plurality of bits based on the compressed string. Each bit may indicate whether data to be transmitted to a respective pre-determined radio communication terminal is present in an access point. The decompression device 700 may further include a position determiner 706 configured to determine, for a plurality of substrings of the received compressed string, a position based on the compressed string. The transmission indication map generator 704 may be configured to insert, for the plurality of substrings of the received compressed string, into the transmission indication map the respective subset of the compressed string at the determined position. The compressed string receiver 702, the transmission indication map generator 704, and the position determiner 706 may be coupled with each other, for example by a coupling 708, for example an electrical coupling or optical coupling, like an electrical line or an optical line, or any other device configured to transmit electrical signals or optical signals, for example a cable.

According to various embodiments, the position determiner 706 may be configured to determine the position as an absolute position in the transmission indication map.

According to various embodiments, the position determiner 706 may be configured to determine the position as a relative position in the transmission indication map with respect to a preceding position.

According to various embodiments, the pre-determined first bit value may be one and the pre-determined second bit value may be zero.

FIG. 8 shows a flow diagram 800 illustrating a compression method according to various embodiments. In 802, a plurality of subsets of a transmission indication map may be determined. The transmission indication map may include a plurality of bits. Each bit may indicate whether data to be transmitted to a respective pre-determined radio communication terminal is present in an access point. In 804, it may be determined for each subset whether the subset includes a bit of a pre-determined bit value. In 806, for each subset, the subset may be inserted to a compressed string if the subset includes a bit of the pre-determined bit value, and for each subset, an indication indicating a position of a subsequent subset in the transmission indication map insert into the compressed string if the subset does not include a bit of the pre-determined bit value.

According to various embodiments, the indication may include or may be an absolute position in the transmission indication map.

According to various embodiments, the indication may include or may be a relative position in the transmission indication map with respect to a preceding position.

According to various embodiments, the pre-determined first bit value may be one and the pre-determined second bit value may be zero.

FIG. 9 shows a flow diagram 900 illustrating a decompression method according to various embodiments. In 902, a compressed string may be received. In 904, a transmission indication map including a plurality of bits may be generated based on the compressed string. Each bit may indicate whether data to be transmitted to a respective pre-determined radio communication terminal is present in an access point. In 906, for a plurality of substrings of the received compressed string, a position may be determined based on the compressed string. In 908, for the plurality of substrings of the received compressed string, the respective subset of the compressed string may be inserted into the transmission indication map at the determined position.

According to various embodiments, the method may further include determining the position as an absolute position in the transmission indication map.

According to various embodiments, the method may further include determining the position as a relative position in the transmission indication map with respect to a preceding position.

According to various embodiments, the pre-determined first bit value may be one and the pre-determined second bit value may be zero.

According to various embodiments, devices and methods for Traffic indication map (TIM) compression, for example in 802.11 based networks, may be provided.

Embodiments relate to methods of compressing traffic indication map (TIM) in wireless local area networks (WLAN), for example, compressing the size of the TIM bitmap in 802.11 based networks to reduce the size of beacons transmitted by an access point, which in turn, saves radio resource and energy.

In the present IEEE (Institute of Electrical and Electronics Engineers) 802.11 standard, an authenticated device (STA, for example a mobile station) wishing to join an infrastructure network may desire to first send an Association Request to the access point (AP). The frame format of the Association Request is shown in Table 1.

TABLE 1

Association Request frame format.

| Order | Information | Notes |
|---|---|---|
| 1 | Capability | |
| 2 | Listen interval | |
| 3 | SSID | |
| 4 | Supported rates | |
| 5 | Extended Supported Rates | The Extended Supported Rates element is present whenever there are more than eight supported rates, and it is optional otherwise. |
| 6 | Power Capability | The Power Capability element shall be present if dot11SpectrumManagementRequired is true. |
| 7 | Supported Channels | The Supported Channels element shall be present if dot11SpectrumManagementRequired is true. |
| 8 | RSN | The RSN information element is only present within Association Request frames generated by STAs that have dot11RSNAEnabled set to TRUE. |
| 9 | QoS Capability | The QoS Capability element is present when dot11QosOption-Implemented is true. |
| Last | Vendor Specific | One or more vendor-specific information elements may appear in this frame. This information element follows all other information elements. |

Upon reception of the authenticated STA's Association Request, the AP may reply an Association Response with the status code to the STA. The format of the Association Response is shown in Table 2. If the status code value is 'successful', the AP may also assign an Association ID (AID; ID may stand for identifier) to the STA and include the AID in the Association Response.

TABLE 2

Association Response frame format.

| Order | Information | Notes |
|---|---|---|
| 1 | Capability | |
| 2 | Status code | |
| 3 | AID | |
| 4 | Supported rates | |
| 5 | Extended Supported Rates | The Extended Supported Rates element is present whenever there are more than eight supported rates, and it is optional otherwise. |
| 6 | EDCA Parameter Set | |
| Last | Vendor Specific | One or more vendor-specific information elements may appear in this frame. This information element follows all other information elements. |

The STA may be considered to be associated with the AP when the Association Response with a status code value of 'successful' is acknowledged by the STA. The association process is illustrated in FIG. 10 for a STA successfully associated with an AP.

Figure 10:
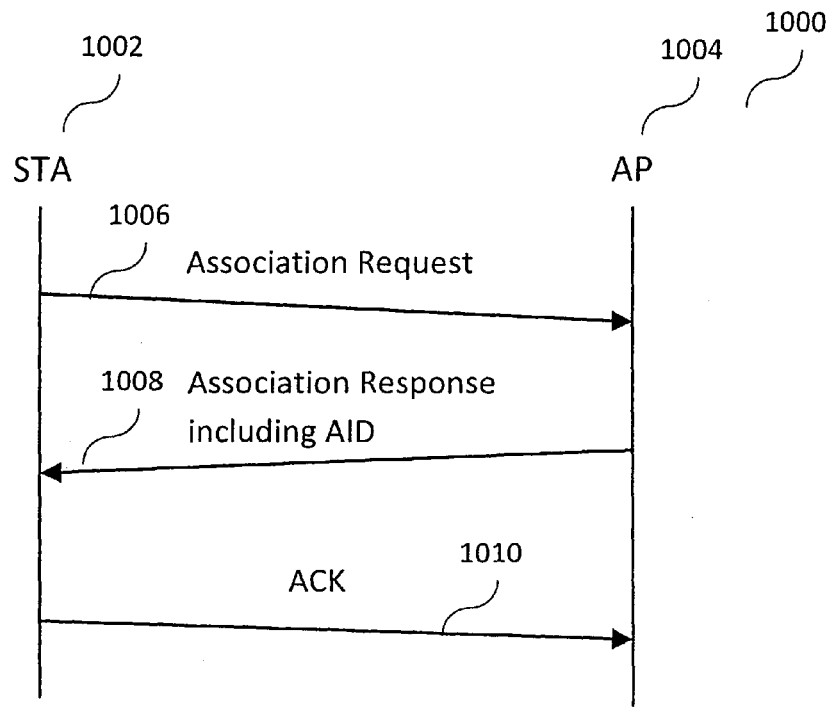
FIG. 10 shows a flow diagram illustrating an association process according to various embodiments.

FIG. 10 shows a flow diagram 1000 illustrating an association process. A mobile radio communication device 1002 (which may also be referred to as STA) may communicate with an access point 1004 (which may also be referred to as AP). In 1006, the STA 1002 may send an association request to the AP 1004. In 1008, the AP 1004 may send an association response including an AID. In 1010, the STA 1002 may send an acknowledgement (ACK).

Each successfully-associated STA may have an AID. At times, the STA may also need to re-associate with the AP (e.g. after AP power down). The procedure of re-association is similar to what is shown in FIG. 10.

In the following, a channel access mechanism will be described.

Figure 11:
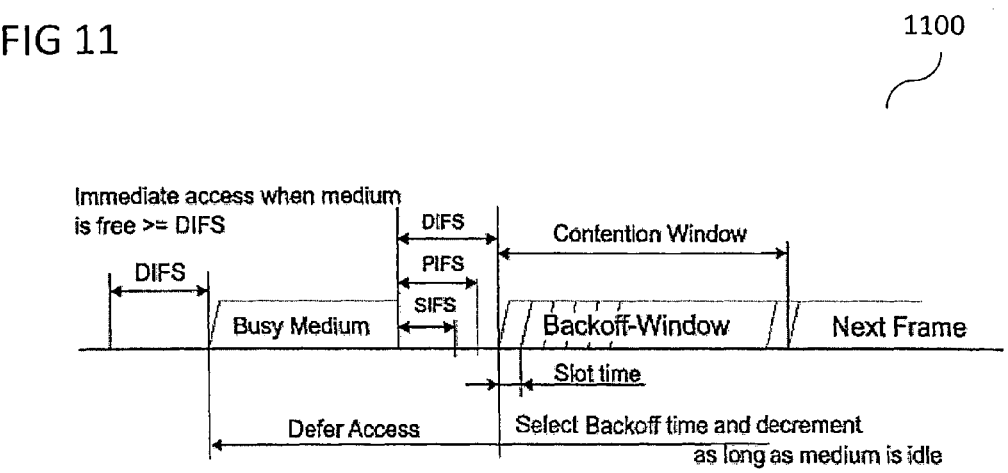
FIG. 11 illustrates a CSMA/CA channel access method according to various embodiments.
Figure 12:
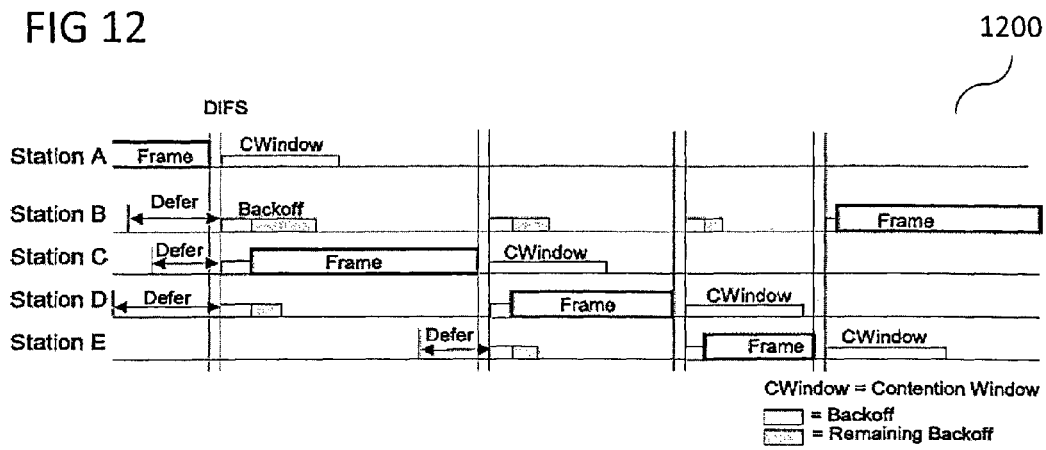
FIG. 12 illustrates a back-off procedure according to various embodiments.

The IEEE 802.11 channel access may have two mechanisms: contention based mechanism and contention-free channel access, which may also be referred to as distributed coordination function (DCF) and point coordination function, respectively. The DCF may basically be a carrier sense multiple access with collision avoidance (CSMA/CA) mechanism, and it may be the fundamental channel access method upon which PCF is built. DCF may be implemented in all STAs, and it may work as follows:

A STA wishing to use the channel for new data transmission may first sense the channel for a certain period of time called the Distributed Inter-Frame Spacing (DIFS). If the channel is free for greater than DIFS, the STA may use the channel, as shown in a flow diagram 1100 of FIG. 11, which illustrates a CSMA/CA channel access method. If the channel is busy during the DIFS, the STA may enter back-off by selecting uniformly a random number from a Contention Window (CW). The STA may maintain a back-off counter. Every time the STA senses that the channel is free for DIFS, the STA may decrease the back-off counter. When the channel is busy, the STA may freeze the back-off counter, as shown in a flow diagram 1200 of FIG. 12, which illustrates a back-off procedure. When the back-off counter reaches zero, the STA may transmit the packet. If an ACK to the packet is received, the data transmission may be successful. After a successful transmission, the STA may set the CW to its minimum (CWmin). If the STA does not receive the ACK, a transmission failure may have occurred, and the STA may double its CW size and may enter a new back-off. The CW size may stay unchanged once its maximum (CWmax) is reached.

Figure 13:
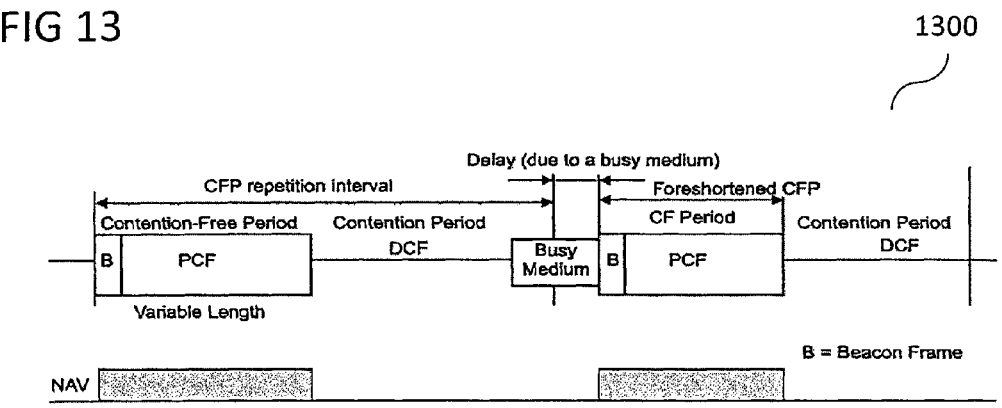
FIG. 13 illustrates coexistence of DCF and PCF according to various embodiments.

The IEEE 802.11 MAC (media access control) in infrastructure mode may also optionally implement the PCF. Prior to PCF, the AP may desire to contend for the channel. Once the AP wins the channel, it may start the PCF process, where it may poll eligible STAs for uplink data and may transmit downlink data. DCF and PCF may alternate with each other and coexist, as shown in a flow diagram 1300 of FIG. 13, which illustrates coexistence of DCF and PCF.

In the following, beacons will be described. In an infrastructure basic service set (BSS), the AP may periodically generate Beacon messages. The IEEE 802.11 Beacon frame format is shown in Table 3.

TABLE 3

Beacon frame format.

| Order | Information | Notes |
|---|---|---|
| 1 | Timestamp | |
| 2 | Beacon interval | |
| 3 | Capability | |
| 4 | Service Set Identifier (SSID) | |
| 5 | Supported rates | |
| 6 | Frequency-Hopping (FH) Parameter Set | The FH Parameter Set information element is present within Beacon frames generated by STAs using FH PHYs. |
| 7 | DS Parameter Set | The DS Parameter Set information element is present within Beacon frames generated by STAs using Clause 15, Clause 18, and Clause 19 PHYs. |
| 8 | CF Parameter Set | The CF Parameter Set information element is present only within Beacon frames generated by APs supporting a PCF. |
| 9 | IBSS Parameter Set | The IBSS Parameter Set information element is present only within Beacon frames generated by STAs in an IBSS. |
| 10 | Traffic indication map (TIM) | The TIM information element is present only within Beacon frames generated by APs. |
| 11 | Country | The Country information element shall be present when dot11MultiDomainCapabilityEnabled is true or dot11SpectrumManagementRequired is true. |
| 12 | FH Parameters | FH Parameters as specified in 7.3.2.10 may be included if dot11MultiDomainCapabilityEnabled is true. |
| 13 | FH Pattern Table | FH Pattern Table information as specified in 7.3.2.11 may be included if dot11MultiDomainCapabilityEnabled is true. |
| 14 | Power Constraint | Power Constraint element shall be present if dot11SpectrumManagementRequired is true. |

TABLE 3-continued

Beacon frame format.

| Order | Information | Notes |
|---|---|---|
| 15 | Channel Switch Announcement | Channel Switch Announcement element may be present if dot11SpectrumManagementRequired is true. |
| 16 | Quiet | Quiet element may be present if dot11SpectrumManagementRequired is true. |
| 17 | IBSS DFS | IBSS DFS element shall be present if dot11SpectrumManagementRequired is true is an IBSS. |
| 18 | TPC Report | TPC Report element shall be present if dot11SpectrumManagementRequired is true. |
| 19 | ERP Information | The ERP Information element is present within Beacon frames generated by STAs using extended rate PHYs (ERPs) defined in Clause 19 and is optionally present in other cases. |
| 20 | Extended Supported Rates | The Extended Supported Rates element is present whenever there are more than eight supported rates, and it is optional otherwise. |
| 21 | RSN | The RSN information element shall be present within Beacon frames generated by STAs that have dot11RSNAEnabled set to TRUE. |
| 22 | BSS Load | The BSS Load element is present when dot11QosOption-Implemented and dot11QBSSLoadImplemented are both true. |
| 23 | EDCA Parameter Set | The EDCA Parameter Set element is present when dot11QosOptionImplemented is true and the QoS Capability element is not present. |
| 24 | QoS Capability | The QoS Capability element is present when dot11QosOption-Implemented is true and EDCA Parameter Set element is not present. |
| Last | Vendor Specific | One or more vendor-specific information elements may appear in this frame. This information element follows all other information elements. |

In the following, a power saving mode will be described.

Figure 14:
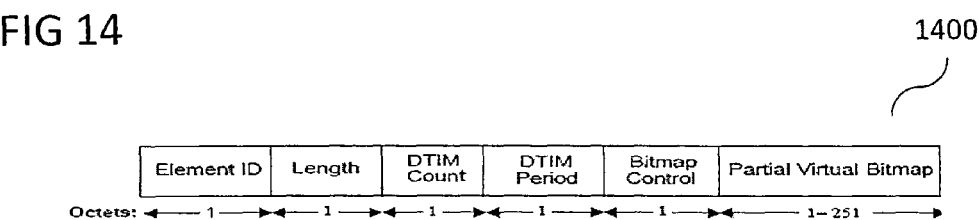
FIG. 14 shows an information element format according to various embodiments.

The IEEE 802.11 may support power-saving mode operation. An STA may go to power saving (PS) mode and may only listen periodically to Beacon messages to check whether there is any data buffered for it in the AP. If there is data for a STA while it is in PS mode, the AP may buffer the data and inform the STA. This may be achieved via the traffic indication map (TIM) information element (IE) in the Beacon message. The TIM information element format 1400 is shown in FIG. 14, where DTIM may stand for delivery traffic information message. The TIM may be controlled by the AP.

The traffic indication virtual bitmap may include a maximum of 2008 bits. Each bit in the traffic indication virtual bitmap may correspond to one particular STA. When the bit is set to 1, it may indicate that there is data buffered in the AP for the corresponding STA. When the bit is 0, it may indicate that there is no data buffered in the AP for the corresponding STA. AID 0 may be used to indicate broadcast. The partial virtual bitmap may not always start from AID 0. This may be controlled by the offset value in bitmap control subfield, which may indicate the starting AID of the partial virtual bitmap.

Figure 15:
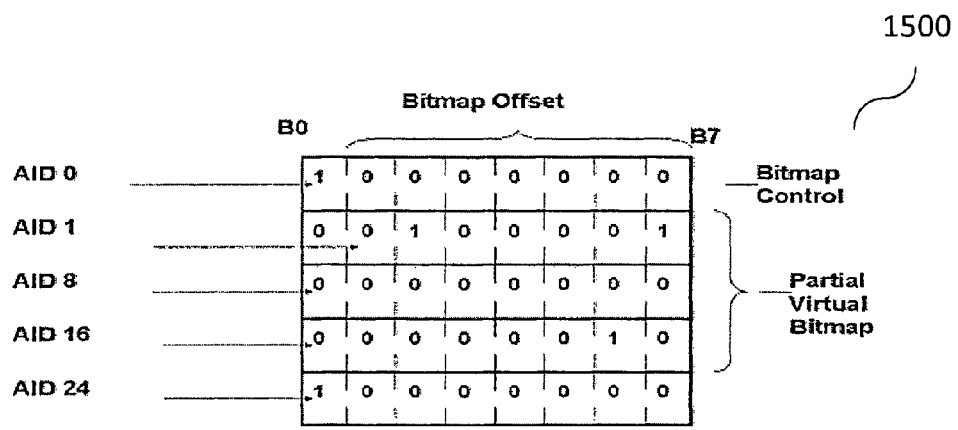
FIG. 15 illustrates encoding a TIM virtual bitmap according to various embodiments.

An example of encoding a TIM virtual bitmap 1500 is shown in FIG. 15, where STAs with AID 2, 7, 22, and 24 have data buffered in the AP. B0 of the bitmap control field (AID 0) is also set to indicate broadcast data packet.

Figure 16:
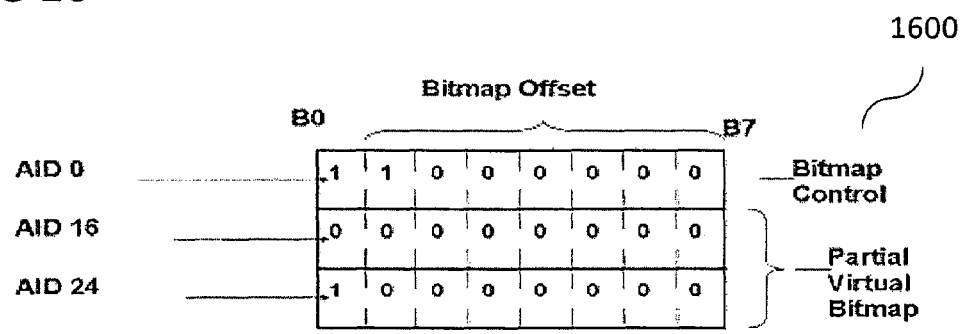
FIG. 16 illustrates a virtual bitmap according to various embodiments.

Bits B1 to B7 in the bitmap control field may determine the bitmap offset. An example of virtual bitmap 1600 with offset is shown in FIG. 16, where the offset value is 1, corresponding to AID offset of 16. The Partial Virtual Bitmap field may include octets numbered N1 to N2 of the traffic indication virtual bitmap, where N1 may be the largest even number such that bits numbered 1 to (N1 8)−1 in the bitmap are all 0 and N2 is the smallest number such that bits numbered (N2+1) 8 to 2007 in the bitmap are all 0. In this case, the Bitmap Offset subfield value may include the number N1/2. When decoding, the offset value may be desired to be multiplied by 2 to derive the real offset value.

Figure 17:
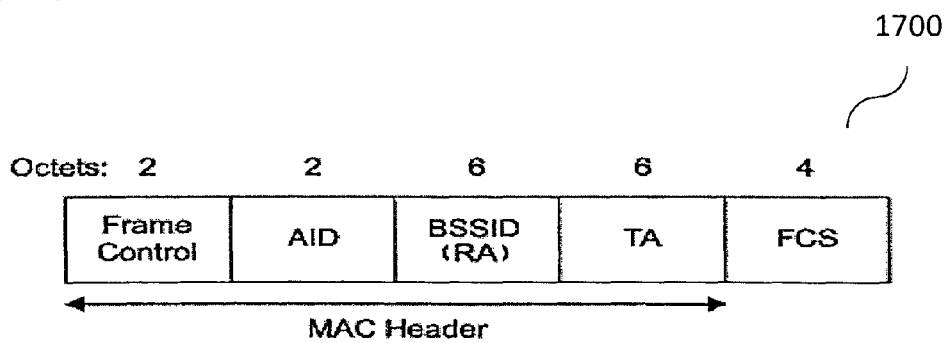
FIG. 17 shows a PS-Poll frame format according to various embodiments.

From the Beacon message received, a STA may be able to determine whether the AP has buffered data for it. If the corresponding TIM bit is set, the STA may send a power-saving poll (PS-Poll) message to the AP. The format of the PS-Poll (in other words: a PS-Poll frame format) 1700 is shown in FIG. 17, wherein BSSID (RA) may stand for basic service set identifier (receiver address), TA may stand for transmitter address, and FCS may stand for frame check sequence.

The format of the AID field in the PS-Poll is shown in Table 4.

TABLE 4

AID field in PS-Poll.

| Bits 0-13 | Bit 14 | Bit 15 | Usage |
|---|---|---|---|
| 0-32 767 | | 0 | Duration value (in microseconds) within all frames other than PS-Poll frames transmitted during the CP, and under HCF for frames transmitted during the CFP |
| 0 | 0 | 1 | Fixed value under point coordination function (PCF) within frames transmitted during the CFP |
| 1-16 383 | 0 | 1 | Reserved |
| 0 | 1 | 1 | Reserved |
| 1-2007 | 1 | 1 | AID in PS-Poll frames |
| 2008-16 383 | 1 | 1 | Reserved |

For most frames, this field may have shared definition of AID or Duration. The exact definition is indicated by Bit 14 and Bit 15. When both bits are set, the definition of AID is used. It should be noted that only AID values from 1 to 2007 are supported whereas values beyond 2007 are reserved. This may be a result of the limited length of the TIM IE, which can support a maximum of 2007 unicast AIDs.

Upon reception of the PS-Poll, the AP may transmit the buffered data to the STA immediately. Alternatively, the AP may choose to transmit the buffered data at a later time. In this case, the AP may send an ACK to the STA and the STA may desire to listen for the data packet.

One of the design requirements of 802.11AH standard is to support smart grid application. A single AP may handle up to 6000 STAs and power saving mode may be used to save energy since traffic is sparse for STAs in the network. Hence, in smart grid networks, most of the nodes may be in sleep mode. But when a certain event happens, an AP may be desired to wake up some of them to receive data or commands. TIM may be attached in the Beacon to notify those nodes need to wake up and receive data. With a currently used scheme, either a single TIM bitmap with up to 6000 bits or a few TIMs bitmaps with each up to 2007 bits may be desired to be sent in order to wake up the relative nodes. The size of TIM may be as large as a few hundred bytes. In case only a few nodes are desired to be wake up, the overhead, for example the zero bits in the TIM bitmap, may be quite significant. Although the current standard may allow AP to remove zero bits before the first bytes and the last bytes with bit 1 in the bitmap, it may be not good enough. One example may be, when the first and last bits in the bitmap are one and all other bits are zero, all 2007 bits may be desired to be sent. In this case, a simple compression method may reduce the bits sent out by more than 10 times. It may be shown that, for a 6000 bitmap, as well as the number of 1's is less than 330, a way to compress the bitmap to a size of 2007 may be found. In many scenarios, the number of nodes desired to be wake up may be less than 300 and compression of TIM may reduce the beacon significantly.

According to various embodiments, devices and methods may be provided which may help in compress the TIM bitmap. In case many nodes are desired to be wakeup by the same beacon, they may contention for media to transmit PS-Poll signalling. Collision may happen and thus degrade the system performance. Thus, furthermore, devices and methods may be provided that may help in reliving contention when many nodes are wake up by a beacon.

To support 6000 STAs, new information may be tagged to each device. For example, multiple STAs may share a single AID, and the STAs may be differentiated by the new 'Device Information' element.

The TIM definition may also be altered to support 6000 STAs. For example, rather than using all the 2007 bits as traffic indication bitmap, two bits may be used to indicate grouping. For each TIM, one group (as indicated by the two grouping bits) may be addressed. The STAs of the group may be addressed by the remaining 2005 bits.

The STAs may be grouped based on application time or location. Each group may include up to 2007 STAs and may be assigned a unique BSSID. It is to be noted from the Beacon frame format that every Beacon may include a BSSID subfield. Hence different groups may be addressed by using the BSSID for each corresponding group in the Beacon. The interpretation of the TIM may remain the same.

The STAs may also be assigned different beacon intervals with different offset. Multiple STAs may be allowed to share one AID, but they may not wake up at the same time. At each Beacon, a maximum of one STA from the sets of STAs sharing one AID may wake up. As the wake up time may be known by the AP, the AP may be able to set the TIM correspondingly.

With the current IEEE 802.11 standard, to reduce the TIM bitmap size, some of the zero bits before and after the first non-zero bytes and last non-zero bytes may be removed from the bitmap when it is sent out. Therefore, it is called a partial virtual bitmap. The method may be as follows:

1. As FIG. 14 shows, the length of field of TIM IE may be used to derive the length of the TIM bitmap.

2. Bit 0 of the bitmap control field may include the Traffic Indicator bit associated with Association ID 0. This bit may be set to 1 in TIM elements with a value of 0 in the DTIM count field, when one or more broadcast or multicast frames are buffered at the AP. The remaining 7 bits of the field may form the Bitmap Offset.

3. The Partial Virtual Bitmap field in TIM IE may include octets numbered N1 through N2 of the traffic indication virtual bitmap, where N1 may be the largest even number such that bits numbered 1 through (N1×8)−1 in the bitmap may be all 0 and N2 may be the smallest number such that bits numbered (N2+1)×8 through 2007 in the bitmap may all be 0. In this case, the Bitmap Offset subfield value may include the number N1/2, and the Length field is set to (N2−N1)+4.

According to various embodiments, devices and methods may be provided to reduce the size of TIM bitmap. According to various embodiments, the devices and methods may be used to compress the size of the bitmap.

Devices and methods for direct indexing will be described in the following.

Figure 18:
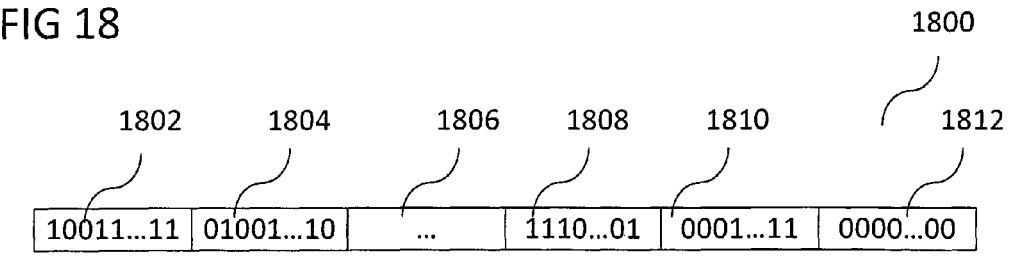
FIG. 18 shows TIM of N active nodes using direct indexing according to various embodiments.

According to various embodiments, 13 bits may be to encode the AID of an active node, and the 13 bit addresses may be concatenated to address more nodes. The maximum possible nodes that may be supported within 2007 bits are thus less than 2007/13 or 154 nodes. However, not all 2007 bits may be desired to be filled up if there are less than active 154 nodes within a beacon period. An example of TIM using direct indexing is illustrated in a TIM 1800 shown in FIG. 18, which shows TIM of N (wherein N may be an integer number less than 155) active nodes using direct indexing. A field 1802 may indicate an address of a first active node and may include 13 bits. A field 1804 may indicate an address of a second active node and may include 13 bits. Fields 1806 may indicate addresses of further active nodes. A field 1808 may indicate an address of an (N−1)-th active node and may include 13 bits. A field 1810 may indicate an address of an N-th active node and may include 13 bits. A field 1812 may include zero padding, and may include 2007-13 N bits.

It is to be noted that in direct indexing as described above, each 13 bits may be used to signal 8192 nodes while we only 6000 nodes may be needed. Therefore, the leftover 2192 addresses may be further extended in the standard to signal multicasting groups or broadcasting. In addition, the order of the activate nodes in TIM may be used to signal the schedule of active nodes within beacon period. However, only a maximum of 154 nodes may be supported, which may not be suitable for long beacon periods that may be intended to contain more than 154 active nodes.

Devices and methods for direct indexing with group field according to various embodiments will be described in the following.

This may be regarded as an extension to the devices and methods described above for direct indexing, and may include the following.

Each 802.11 station (STA) may be addressed by 13 bits of which the first n bits may be for group indexing and the remaining (13-n) bits may be used for a STA identifier within each group During encoding, only active groups, for example those with at least 1 active STA, may be considered. Furthermore, for each active group, the encoding may include specifying the number active STAs, followed by specifying (13-n)-bit identifiers of active STAs in the group.

According to various embodiments, a g-bit bitmap may be placed at the beginning of TIM to specify whether each of the groups is active or not. As it may be desired to support a total of 6000 STAs, the minimum number of groups may be Ceiling($6000/2^{\{13-n\}}$), where Ceiling(x) may provide the nearest integer not less than x. As a result, the minimum value of g may also be Ceiling($6000/2^{\{13-n\}}$). Next, after the g-bit bitmap, for each active group in fixed order, a (13-n)-bit "length field" may be used to specify the number of active STAs of the group that are included in this TIM. This may be followed by the (13-n)-bit identifier of each of these active STAs.

The pseudo-code for TIM format is specified bellow:

```
TIM_Format{
  g-bit bitmap to identify active/non-active groups; g =
  \Ceiling(6000/2^{13-n})
  for (i = 0; i < #active groups; i++){
    (13-n)-bit "length field" to indicate the number of active STAs in
    the group
    for (j = 0; j < #active STAs; j++){
      (13-n)-bit of STA identifier
    }
  }
}
```

According to various embodiments, the value of n may be chosen to optimize system performance. As an example, n may be chosen to be equal 6, which may allow the AP to always address at least 234 active STAs.

According to various embodiments, devices and methods may be provided which may be similar to the embodiments described above except that there may be no g-bit bitmap present at the beginning of the TIM field to indicate the active group. Instead, the presence of each active group may be indicated by 1-bit field before the (13-n)-bit "length field".

Similarly, n may be chosen to optimize system performance. As an example, n may be chosen to be equal 6, which may allows the AP to always address at least 234 active STAs.

According to various embodiments, there may be no g-bit bitmap field at the beginning of the TIM. Instead, each active group may be encoded explicitly with the group index followed by the (13-n)-bit "length field" similar to the embodiments described above.

The pseudo-code for TIM format may be as specified bellow:

```
TIM_Format{
  for (i = 0; i < #active groups; i++){
    n-bit group index
    (13-n)-bit "length field" to indicate the number of active STAs in
    the group
    for (j = 0; j < #active STAs; j++){
      (13-n)-bit of STA identifier
    }
  }
}
```

According to various embodiments, the value of n may be chosen to optimize system performance. As an example, n may be chosen to be equal 5, which may allow the AP to always address at least 213 active STAs. The AP may also dynamically order the active groups to imply a certain scheduling preference.

Devices and methods for compression using run-length code according to various embodiments will be described below.

The 2007 bits TIM may be encoded using run-length code together with Golomb Code, like will be described in the following.

In a first step, run-length coding may be provided.

The bit-map, which contains more 0's than 1's, may be converted into a series of numbers which indicate the number of 0's in-between 1's. For example, if a 16-bit TIM bitmap may be 1001 1000 0001 1000, this bit-map may be translated into run-length of 0's as "0 2 0 9 0". It is to be noted that the last three consecutive 0's may not be coded. Therefore, for a bit-map with a length of L bits, of which it includes at most N 1's, the total number of run-length codes that need to be encoded may be N−1.

In a second step, a Golomb code of run-length may be provided.

Golomb code may be used to encode the run-length of 0's in TIM. Golomb code may have low complexity, and it may deliver good performance for geometrically distributed signal. It is to be noted that, if the 1's is uniformly distributed, the distribution of the run-length code may be geometrically distributed.

Now, it may be assumed the there are N−1 run length code $x\_1, x\_2, \ldots, x\_\{N-1\}$ to be compressed. Using Golomb code with parameter P, each symbol $x\_i, i=1, \ldots, N-1$ may be divided into two parts as follows:

$$h\_i = \text{floor}(x\_i/2^P);$$

$$l\_i = x\_i - h\_i * 2^P,$$

where floor( ) may be the rounding to highest integer operation. After that, l_i may be coded with P bits, and h_i may be unitarily coded with h_i 0's terminated with a 1 (see the following table for an example of unitary code).

| h_i | Codeword for h_i |
|---|---|
| 0 | 1 |
| 1 | 01 |
| 2 | 001 |
| ... | ... |
| N | 000 . . . 01 (N zeros) |

For example, if P=4, x_i=65, one may have $$h\_i = \text{floor}(x\_i/2^4) = 4;$$

$$l\_i = x\_i - h\_i * 2^4 = 1.$$

Therefore, may be coded as binary code with 4 bits as 0001, and h_i may be coded as 00001.

In this scheme, the total length of the codeword desired to encode a bit-map of L bits with N 1's may be given by $W(N,P) = \text{sum}\_1^{\{N-1\}} (\text{floor}(x\_i)/2^P+1) + N*P$, s.t $\text{sum}\_1^N(x\_i < 6000)$ and $x\_i > 0$.

It is to be noted that the first term in the right may be from the unitary code of h_i and the second term may be from binary code of l_i.

Let P'=argmin W(N,P), and after some mathematics one may have P'=floor(log 2(L/N)).

Now, if L=6000, W(N,P')<2007, the maximum possible N may be 330, P'=4, and W(N,P')=2004. That is, it may be possible to a TIM with 330 1's in the worse-case scenario.

The decoding complexity of this scheme may be evaluated as follows:

The total numbers of operations to decode one run-length may be given in the following table:

|  | Add | Bit-Shift |
|---|---|---|
| Decoding of l_i | 0 | 0 |
| Decoding of h_i | h_i | 0 |
| Decoding of x_i | 1 | 1 |
| Total | h_i + 1 | 1 |

It is to be noted that sum(h_i)<sum(x_i)/2^P. Therefore, the total decoding complexity for decoding a TIM bitmap may be smaller than floor(W/2^P)+N additions and N bit-shifts. For example, it may be 2007/16+330=455 additions and 330 bit-shifts, or 0.785 MIPS on a 8 bit microcontroller if the decoding time is limited to 1 ms.

The TIM compressed using this method may not imply the schedule of the active nodes.

The Golomb code parameter P may not be fixed and may be transmitted in the same beacon frame as the TIM bitmap using other fields in the TIM element, e.g. bitmap control. Allowing a flexible parameter P may give better control over the bitmap compression efficiency for arbitrary bitmap.

The TIM compressed using this method may not imply the schedule of the active nodes.

Devices and methods for compression using a dictionary based approach according to various embodiments will be described in the following.

It may be possible to compress TIM using a dictionary based compression scheme such as LZ (Lempel-Ziv) algorithms or its variances. For example, first, the 6000 bits TIM may be broken up into smaller bit blocks (e.g., 8 bits). After that, the TIM may be scanned to find frequent reoccurring 8-bit blocks and select them into a dictionary. Once this is done, the frequent reoccurring 8-bits blocks in TIM may be replaced with their index in the dictionary. Data compression may be achieved as the index of these frequent reoccurring 8-bits may be shorter than 8 bits. In this scheme, in order to avoid decoding dependency among beacons, the dictionary may be transmitted together with the actual compressed TIM using 2007 bits which will introduce an overhead. However, this may be very efficient if the TIM to be compressed has many reoccurring patterns.

The TIM compressed using this method may not imply the schedule of the active nodes.

In all the above methods and devices, if the actual active nodes to be transmitted could not be accommodated in the last beacon, they may be encoded and sent in the next beacon. In such a case a scheduling algorithm in the AP may be desired to be implemented to determine the order of STAs based on their priorities and transmission deadlines. In addition, to handle the delay, the beacon period may be adjusted such that the previous beacon has an interval just sufficient to handle the previously encoded.

Devices and methods for compression using OR-ing according to various embodiments will be described in the following. For example, a compression method for AID bitmap may use OR-ing.

The sparse string (AID bitmap) L1 of size n1 bits may be assumed. In a first step, L1 may be divided into k (e.g. 4 or 8) substrings (in other words: subsets of the transmission indication map), for example of equal size. In each substring, all bits may be logically OR-ed and the results (one bit per substring) may become string L2 (in other words, it may be determined whether a non-zero bit is present in L1, and L2 may include zero if a non-zero bit is not present, and one otherwise), which may be compressed in a next step. All zero substrings of L1 may be deleted.

For example, L1=0000|0000|0000|0100|0000|0000| 0000|1000|0000|0000|0000|0000|0010|0000|0000|0000.

After ORing each 4-bit substring, the 16-bit string L2=0001|0001|0000|1000 may be determined.

In a second step, the same process may be applied to L2, and the result may be the 4-bit string L3=1101, which may be short enough so no more compression steps may be needed. After deleting all zero substrings in L1 and L2, one may end up with the three short strings $L1=0100|1000|0010$, $L2=0001|0001|1000$, $L3=1101$.

The output stream may include seven 4-bit substrings instead of the original 16. A few more numbers may be needed, for example to indicate how long each substring is. The compression procedure is shown in FIG. 19 (TIM OR-ing Compression).

Figure 19:
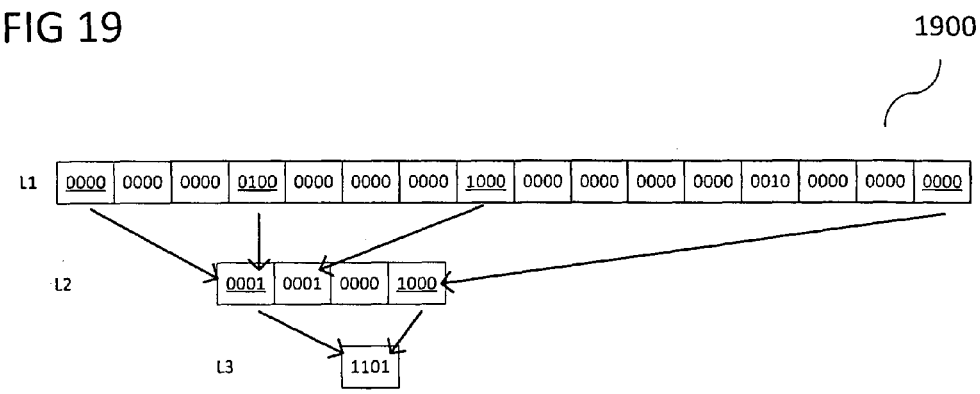
FIG. 19 a compression procedure according to various embodiments.

FIG. 19 shows a flow diagram 1900 illustrating an example of TIM-OR-ing compression, wherein 4-bit logical OR-ing is performed. As shown for some exemplary fields, from L1 to L2, and from L2 to L3 (and generally for every level of iterative compressing), a value of a bit in the next level is 0 if all bits of the respective subset in the present level have a value of zero, and is 1 otherwise. In FIG. 19, underlined printing may be used to show or highlight some example of how the underlined 4-bit string is indicated in the next level compression. For example, first underlined data of 4-bit string "0000" of L3 is indicated in the first bit of 1st 4-bit string "0001" of L2; second underlined data of 4-bit string "0100" of L2 is indicated in 4th bit of 1st 4-bit string "0001" of L2.

For example, a pseudo code of TIM OR-ing compression may be as follows:

```
Store the M round compression results into the array d[1...M]. s is the
original bitstring to compress.
Store the length of resulting compressed bitstring into the array l[1...M]
corresponding to each round.
Initialize s=AID bitmap (bitstring) to compress
T=strlen(s);      %strlen returns the length of string s
M=1;
While T>k
    T=T%k;
    M=M+1;
End
For i=1:M
    If (i>1)
        tempStr = d[i];%d[i] is the i-th element in array d[1...M]
    else
        tempStr = s;
end
zeroPadding(tempStr,k); %padding with zero for string tempStr into
multiple k-bit string.
    j=1;
While l[i] >= k*j
    % getBits (tempStr,k*j,k*(j+1)) returns the partial bitstring from
tempStr, which starts from index k*j and ends at index k*(j+1)
        %OrBits (src,k) returns the logical OR for k-bit string src
%addStr (dst,src) returns the string by post-adding string src into string dst
        addStr(d[i+1],OrBits(getBits(tempStr,k*j,k*(j+1)),k));
        j=j+1;
End
End
For i=1:M
j=1;
While l[i] >= k*j
    If (getBits (d[i],k*j,k*(j+1))==zero bits)
%zeroRemove (src, startpos, endpos) returns the string by removing the
bits starting at startpos and ending at endpos from the original string src
        zeroRemove(d[i] ,k*j,k*(j+1));
l[i]= l[i]–k;
```

-continued

```
Else
        j=j+1;
End
End
l[i]=strlen(d[i]);
End
return M,d [1...M] and l[1...M]
```

Figure 20:
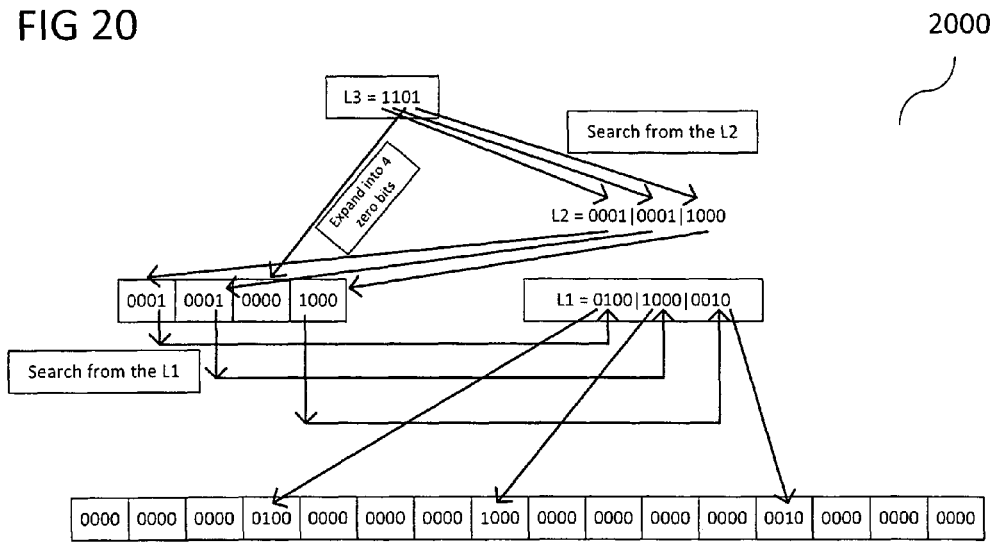
FIG. 20 a decompression procedure according to various embodiments.

According to various embodiments, a respective decoder may work as will be described in the following. It may receive compressed substring L1, L2 and L3, and their lengths. It may starts with L3 and may considers each of its 1-bits a pointer to a substring of L2 and each of its 0-bits a pointer to a substring of all zeros that is not stored in L2. This way, string L2 may be reconstructed from L3, and string L1, in turn, from L2. FIG. 20 illustrates this process.

FIG. 20 shows a flow diagram 2000 illustrating TIM-OR-ing decompression.

The pseudo code of TIM OR-ing decompression may be as follows:

```
Note that STA need not to decode all the bits for its own. Consider M rounds OR-ing. The resulting
substrings surviving from deletion of zero bitstrings are stored into the array d[1...M] and the
corresponding length in the array l[1...M]. The order is decreasing, which means the 1st round resulting
substrings is stored in s[M] (M-th element of s[1...M]) and last round resulting substrings is stored in
s[1]. Suppose the whole bitstring with length of L and divide into k-bit substring, and the STA is
allocated/associated with AID=x. Denote the array b[1...M] as the decompressed substring buffer for M
round decompression.
For i=1:M
    R[i] = x;         %R[i] is the bit index of STA with AID=x in substring s[i];
    For m=1:i−1
        R[i]   = R[i]%k;
    End
End
Strcpy(b[1],s[1]) %copy substring s[1] into b[1]
For i=1:M
%getBit is the function to retrieve the bit index R[i] in substring s[i]
    If (getBit(b[i],R[i]) == 0
%Bit is not set for this STA in the Partial virtual bitmap
        Return 0 %end of the search
    Else
        %Restore the substrings for this round decompression
m = 1;
While m < R[i]
If (getBit(b[i],m)==1)
    %getStr(s[i+1],(m−1)*k+1,m*k) returns k-bit string with the staring bit index (m−1)*k+1 and
ending bit index m*k from s[i+1]
    addStr(b[i+1],getStr(s[i+1],(m−1)*k+1,m*k))%restore substring for each nonzero bit in s[i] with
s[i+1]
Else
    addZero(b[i+1],k);%add k-bit zero substring into b[i+1]
End
m = m+1;
End
%getBit(b[i],R[i]) is 1 need to add nonzero substring as well
addStr(b[i+1],getStr(s[i+1],(m−1)*k+1,m*k));
    End
End
```

If it (for example the TIM) is divided into 8-bit substring, it may be desired to perform 4 rounds OR-ing. First round, 6000 bits will be divided into 750 8-bit substrings. In each substrings, all bits (8 bits) may be OR-ed (in other words: an OR operation on all the bits may be performed) so that 750 8-bit substrings may become 750 bits, and may further be divided into 94 8-bit substrings after padding with zero bits. Then at second round OR-ing, the result may become 94 bits and may be divided into 12 8-bit substrings after padding. At third round OR-ing, the result may become 12 bits and may be divided into 2 8-bit substrings after padding. At the fourth round OR-ing, the result may become 2 bits, which may be short enough so no more compression steps may be desired.

In this case, the length for 1st round compression result may be represented in 10 bits; the length for 2nd may be 7 bits; the length for 3rd may be 4 bit; the length for 4th may be 1 bit. Therefore total number of bits to represent the lengths of compression results may be 22 bits, which is less than 3 bytes.

If it (for example the TIM) is divided into 4-bit substring, it may be desired to perform 5 rounds OR-ing. In a first round, 6000 bits may be divided into 1500 4-bit substrings. In each substrings, all bits (4 bits) may be OR-ed so that 1500 4-bit substrings may become 1500 bits, and may further be divided into 375 4-bit substrings after padding with zero bits. Then at a second round OR-ing, the result may become 375 bits and may be divided into 94 4-bit substrings after padding. At a third round OR-ing, the result may become 94 bits and may be divided into 12 4-bit substrings after padding. At the fourth round OR-ing, the result may become 12 bits and may be divided into 3 4-bit substrings. At a fifth round OR-ing, the result may become 3 bits, which may be short enough so no more compression steps are needed.

In this case, the length for 1st round compression result may be represented in 11 bits (like will be described below); the length for 2nd may be 9 bits; the length for 3rd may be 7 bit; the length for 4th may be 4 bit; the length for 5th may be 2 bit. Therefore total number of bits to represent the lengths of compression results may be 33 bits, which may be less than 5 bytes. For example, 11 bits ($2^{11}=2048>1500$) may be desired to represent the length of the bit string that is used to indicate whether each of the 1500 4-bit substring is '0000' or non-'0000' (e.g. using 0 to represent '0000' is the substring and use 1 to present non-'0000'). In other words, the length of the bit string is 1500 and may be expressed by at least 11 bits.

Devices and methods for compression using offset and length according to various embodiments will be described in the following.

In line with an IEEE 802.11 standard, some of the 0 bits in the TIM bitmap may not transmitted by specifying the offset and length of partial bitmap. Details of the method may be as described above. However, for those consecutive 0s within the partial bitmap, they may be transmitted without compression. A method to remove some of the consecutive zero's within the bitmap is to allow multiple offset and length field in the TIM IE instead of using only one of them.

Figure 21:
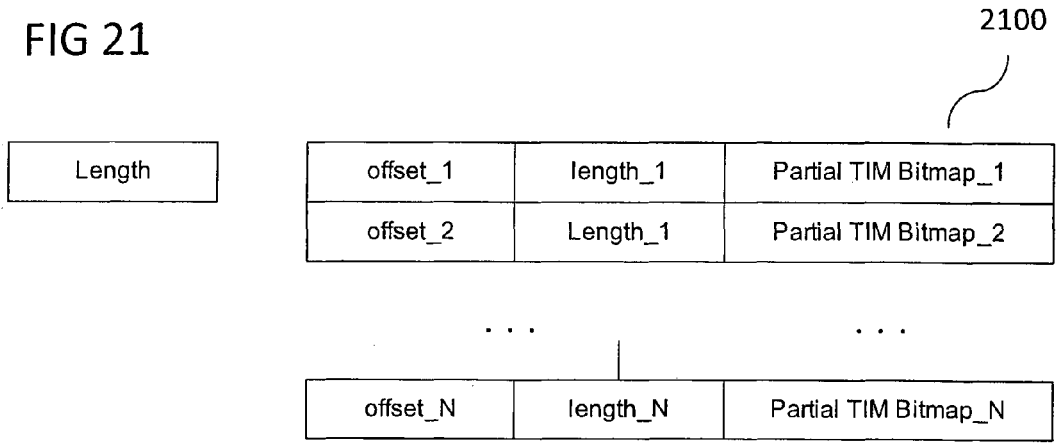
FIG. 21 a flow diagram illustrating using multiple offsets to remove some of consecutive 0 bits within the TIM bitmap according to various embodiments.

FIG. 21 shows an example 2000 of using multiple offsets to remove some of consecutive 0 bits within the TIM bitmap, and to compress the TIM bitmap with an offset and length method according to various embodiments.

The first length field may specify the total length of TIM length, including some control fields, for example, the DTIM counter and Bitmap control field as shown in FIG. 14 above.

An offset field may provide a way to derive the starting point of the partial TIM Bitmap following the offset and length field. One way may be using a method such as (offset× 2×8−1) since only even number may be represented by the offset field since only 7 bits may be used to represent numbers up to 250. In case the number of bits in offset field sufficient, the offset value may be any number and the offset value of the starting bit of the partial bitmap can be derived as (offset_N× 8−1). Another method to code the offset filed based on the distance between the current and the bitmap before the current bitmap. For example, a value of offset_k field=(offset_k−length_(k−1) offset_(k−1)) may be used, where offset_k and offset_(k−1) may be absolute positions of the first bit of partial TIM bitmap_k and Partial TIM bitmap(k−1).

It may not be necessary for the offset field to stay together with a length field. A bitmap control field may be put between them.

All the offset and length fields may also be put together within the TIM IE, for example, at the beginning of the TIM IE.

The first offset value may be desired to be an absolute value and others may be either absolute or a value relative to previous one.

FIG. 21 shows an example of the above method.

Devices and methods for compression using multiple groups according to various embodiments will be described below.

Grouping may be used to compress the TIM bitmap. The TIM bitmap may be divided into multiple groups first. For example, the length of TIM bitmap may be L and it may be divided into N groups with each group has a length of M=L/N bits. When all of the M bits within a group are zero, then the bitmap for that group may not be desired to be transmitted. A bitmap may indicate whether a group appears or not within the TIM IE, and may be included in the TIM IE, and each group may be assigned with one bit. If the bit is zero, then the bitmap for the corresponding group may be not included. If a bit is one, then the bitmap of corresponding group may be included. Other compression methods may be used with this grouping method together to further compress the bitmap.

Figure 22:
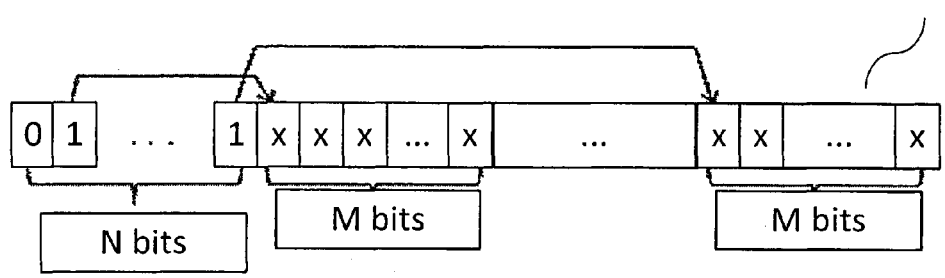
FIG. 22 shows a method of compression of a TIM bitmap with grouping according to various embodiments.

FIG. 22 shows an example 2200 of the above method of compression of a TIM bitmap with grouping.

Devices and method to relive media contention when STA sending PS-Poll according to various embodiments will be described in the following.

A scheme to wake up nodes may be based on AP setting a 1-bit in the bitmap to indicate to the node that the AP has data for it. In the case where many nodes need to be woken up within the same beacon, the PS-Poll sent by those nodes may collide with each other if there is no proper scheme to help schedule the medium access. To avoid collision, an AP may desire that the STAs adjust their initial contention window size so that collision among those STA sending out PS-Poll can be relieved. The station themselves may also adjust their contention window size based on the number of stations with AID bit being turn to 1.

One possible solution may be, when there are N number of STAs that desire to be wake up by a beacon, the AP may choose a contention window size value W based on the number of STAs and the transmission speed of the radio. Here W may be derived based on certain function W(N, r), where N may be the number of station that are desired to be woken up and r may be transmission speed of the radio. The function W(N,r) may be known or unknown to the STA. If the function of W(N, r) is known to the STA, then automatically the STA may choose an appropriate value for contention window after they receive the TIM bitmap. If the W(N,r) is unknown to the STA, then AP may broadcast a desired value of contention window within the beacon so that the STA may set their contention window for PS-Poll sending to the value. The function W(N, r) may be either determined based on experimental or by theoretical analysis.

According to various embodiments, the nodes that are desired to be waken up may be divided into a few groups. For each group, a different value for contention window may be chosen. The STA within the same group may choose back-off time based on the same contention window size specified for this group. One example may be to divide STA into groups based on the values of AIDs. The AIDs with bit turned to 1 may be sorted in ascending order first. With a given group size, the STA may derive which group they are belong and choose the right contention window size based on certain rules.

In the 13 bit addressing scheme described above, the ordering of the address may be used as an indicator to set the size of the contention window. For example the first group of address may have a smaller contention window size. The next group of nodes may have a slightly larger contention window, etc.

According to various embodiments, devices and methods may be provided to improve the efficiency of TIM IE. According to various embodiments, the bitmap control field and a zero byte of bitmap may be excluded when there is no data packet in the buffer of AP. According to various embodiments, a field may be defined to indicate number of bits used to encoding the AID in TIM IE. According to various embodiments, differential encoding may be used to further reduce the number of bits to carry the AID information for traffic indication.

Devices and methods for a TIM IE with reduced format according to various embodiments will be described below.

FIG. 14 shows the format for TIM IE defined in the IEEE 802.11-2007 standard. Besides the Element ID and length, it may also contain DTIM Count, DTIM Period, Bitmap Control and Partial Virtual Bitmap. DTIM period may specify the period that an AP may send out buffered broadcast and multicast to the sleep stations. When DTIM count becomes zero, the multi-cast/broadcast may be sent out. All stations may be desired to wake up to listen for the multi-cast/broadcast messages. Bitmap control and Partial Virtual Bitmap may specify whether multi-cast/broadcast packets are present or stations may have data packet in the buffer.

However, with this standard, even if there is no packet in the AP's buffer, bitmap control and one byte for partial virtual bitmap may still be present in the IE with values of zeros, which may be unnecessary. According to various embodiments, an AP may be provided which does not transmit the bitmap control and the partial virtual bitmap when there is no data packet in the buffer of AP. It may transmit a TIM IE that takes format as specified in FIG. 23. Station (STA) may know whether another control field appears in the TIM IE based on the length field.

Figure 23:
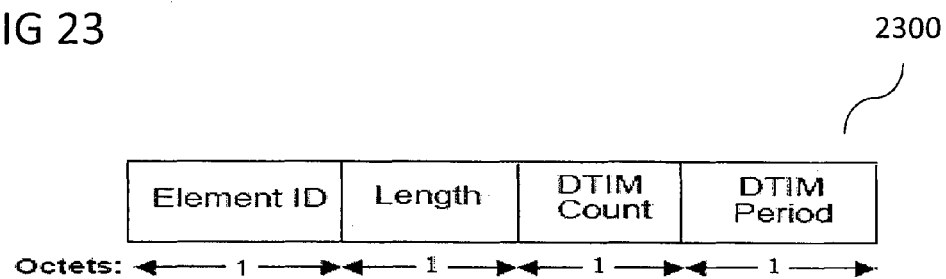
FIG. 23 shows a TIM IE format according to various embodiments.

FIG. 23 shows a TIM IE 2300 in reduce format.

Devices and methods for using AID TIM partial virtual bitmap as traffic indicator according to various embodiments will be described in the following.

Besides using the bitmap, another way to indicate that data packets are in the buffer of an AP for a certain station may be to carry the AID directly in the TIM IE. Since AID may vary from 1 to a few thousand, it may be desired to let a station to know how many bits are used to represent a AID so that they can locate whether their AID is present in the TIM IE or not. Therefore, a field may be used to indicate the number of bits used to represent an AID in the TIM IE.

Considering the AID may not be placed in order in the TIM IE, another control field may be used to indicate whether AID is arranged in ascend/descend order or in other orders.

Devices and methods for differential encoding for TIM compression according to various embodiments will be described in the following.

The AP may divide the complete traffic indication bitmap into one or more segments and may transmit in one or more TIM elements for a large network. When the complete traffic indication bitmap is divided into multiple segments, each segment may indicate the range of the AIDs (bitmap) it is covering.

The AP may allocate its associated STAs to different groups and may match each group's TIM to its awake TBTT. The AP may notify the TBTT (Target Beacon Transmission Time) and sleep interval of each group. A long sleep interval may be supported through grouping of STAs.

A TIM may be compressed when necessary. Furthermore, information across two or more TIMs may be considered.

Although TIM may be split into a few parts to be transmitted, the STAs may not be able to pull the traffic due to low data rate and beacon interval due to the following facts: If 100 bytes MPDU (MAC protocol data unit) is considered with 14 bytes ACK (acknowledgement), the air transmission time for 200 Kbps (kilo bits per second) data rate may be 114*8/200000=4.56 ms, which may be very long. Actually transmission time may be longer due to the fact of the back-off to avoid contention, PS Poll, PHY (physical layer) overhead and IFSs (Inter Frame Spacing) may be desired. In this case, a 100 ms beacon interval may allow about 100/5=20 STAs to complete. Thus, 6000 STAs may need about 6000/20=300 beacon intervals=30 s, so that the delay may be quite large.

According to various embodiments, the AP may form the TIM information through encoding or compressing the encoding results on the difference between two consecutive TIM bitmap or the difference between two TIM bitmaps where the referred TIM or TIM segments may be sent earlier or in the same information element of traffic indication map in full beacon/short beacon/broadcast TIM frames/control signals, for all or a group of STAs.

According to various embodiments, other new TIM bitmap parts may be transmitted without any differential encoding but with or without compression.

According to various embodiments, the AP may desire to give the boundary (starting position and/or ending position or length in bytes/bit/bi-bytes) for different TIM parts with or without differential encoding, either explicitly or implicitly.

According to various embodiments, referred information may be sent out in full/short beacon/broadcast TIM frames/control signals with complete information.

According to various embodiments, the AP may desire some control bits in TIM to indicate that this method is used.

According to various embodiments, low cost devices and methods may be provided that save at most a few hundred bytes for the referred TIM bitmap. When there are a lot of zeros, that means there is no big difference between two consecutive TIM bitmaps or TIM parts in the same information element of traffic indication map, it may be easy to have the compression gain.

According to various embodiments, a complete TIM bitmap (for all or a group of STAs) may be sent in a full beacon, while a short beacon may be transmitted with differential encoded TIM bitmap partially or fully, with a distinct boundary.

According to various embodiments, a full TIM bitmap may be sent in a compressed manner or the encoded format as in 802.11-2007/802.11v.

According to various embodiments, a full TIM bitmap may be grouped, and partial (incomplete) TIM bitmap may be sent in short beacon or other broadcast frames, where the partial TIM may differentially be encoded if necessary for each group separately.

According to various embodiments, the AP may send out full TIM bitmap according to its own decision or upon the request of some STAs.

According to various embodiments, STAs that haven't received full TIM may wait for full TIM in order to do PS-Poll.

According to various embodiments, partial TIM may be helpful for a large number of STAs that are indicated in TIM bitmap.

According to various embodiments, a short beacon may be transmitted in a shorter interval and requires a small size of TIM. Differential encoding with compression for TIM bitmap may be very efficient so it may meet the requirement.

According to various embodiments, if STAs may listen to more TIM (full/short beacon, broadcast TIM frames or other control signals), the differential encoding may be done across multiple TIM bitmaps for different group of STAs or all the STAs with clear reference point, where a reference point may be set as some sequence number in the beacon.

Devices and methods to indicate the format extension of TIM bitmap according to various embodiments will be described in the following.

With the TIM IE defined in the IEEE 802.11 standard as shown in FIG. 14, all control bits may be used up. However, to support TIM compression or grouping, some change of TIM IE may be provided. The best way to make the change of TIM IE format may be that the capacity of Bitmap is not reduced in the worst case scenarios. For example, if one octet is used in the bitmap for group or compression, this may reduce the capacity of bitmap by 8.

Based on the IEEE 802.11 specification, the bit 1 to 7 in the Bitmap Control field of TIM IE may be used to specify the starting octet of the partial TIM bitmap contained in the TIM IE. The value may be 0, 1, 2, . . . , 127. Since only even number is allowed to be as an offset, the real value may be divided by two and then put in the bitmap control field. Because the maximum length of Bitmap is 251 octets, the maximum value that is put in the bitmap control field may be 125. Therefore, 126 and 127 may be two values that are not used. Hence, one of them may be used to indicate that the bitmap is compressed or grouped. That is, when the offset value in bitmap control field is less than or equal to 125, then the TIM Bitmap in the TIM IE may be in the format specified by the standard. If the value is 126 or 127, it may indicate that the bitmap is compressed or is grouped. One example may be to use one of them to represent compression and another value to represent extension for grouping.

Figure 24:
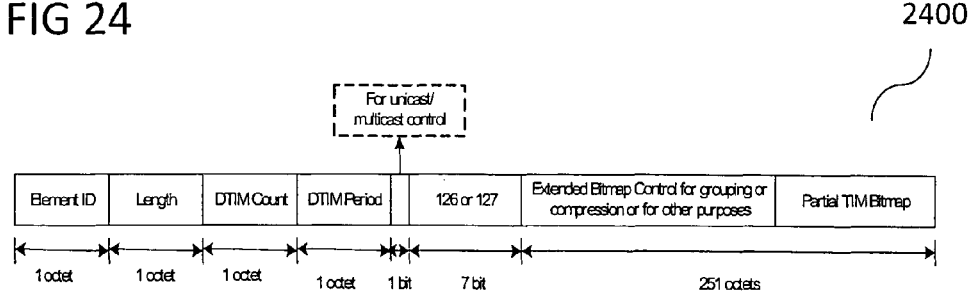
FIG. 24 shows a design for a TIM Extension according to various embodiments.

FIG. 24 shows an example design 2400 for a TIM Extension.

In case the bitmap is in compression format, the extended bitmap control field may specify the information such as compression method, offset of the bitmap etc.

The advantage of above design may be that the capacity of bitmap is kept the same when compression and may not reduce the size of bitmap.

Devices and methods for a use of TIM compression for different TIM extension methods according to various embodiments will be described in the following.

The TIM bitmap specified by the IEEE 802.11 standard may have a maximum length of 2007 bit and may not support more than 2007 stations. Smart grid application may require supporting more than 6000 nodes. To extend the TIM bitmap may be necessary. For example, multiple BSSID may be used, a single TIM bitmap may be used that can support up to 6000 bits, a time division method may be used, or grouping may be used.

The compression methods and devices as described about may be used together with various other TIM Bitmap extension methods and devices.

Devices and methods for a use of a TIM compression when multiple BSSID are used for a TIM extension according to various embodiments will be described in the following.

To enable TIM support up to 6000 nodes, multiple BSSID may be used by an AP. Each BSSID may support up to 2007 nodes. Therefore, three BSSIDs may support more than 6000 nodes. For each STA, it may not be aware other BSSIDs. It may operate based on the BSSID it is associated to. With this method, the TIM bitmap may be exactly the same as the TIM defined in the standard.

With such a design, the AP may desire to send beacon either more frequently or send a few beacons back to back. For example, when the number of STA is less than 2007, the AP may desire to send beacon with interval of T millisecond; when the number of STA increases to 6000, then the AP may desire to send beacon every T/3 milliseconds or send 3 beacons back to back every T milliseconds.

The compression of TIM bitmap may be to compress a bitmap up to 2007 bit.

When the number of 1 bit is less than 154, one of the methods specified above may be used. The advantage of this method may be that certain scheduling information may be derived based on position of the AID code assign to the STA.

The bitmap may also be compressed by other methods described above or with any combination of the methods described above.

In case the bitmap after compression is larger than the partial bitmap size specified with existing method, then the AP may send the partial bitmap without compression.

Devices and methods for a use of TIM compression when a single TIM bitmap is used to Support 6000 STAs according to various embodiments will be described in the following.

When a single TIM bitmap is used to support up to 6000 STAs, then the bitmap may have 6000 bits.

Similar to the BSSID method described above, when the number of 1 bit is less than 154, one of the methods described above may be used.

Whenever the number of 1's bit are less than 330, the bitmap may always be compressed to less than 2007, which may reduce the bitmap size by 66%.

Devices and methods for a use of TIM compression when a TIM bitmap grouping is used to Support 6000 STAs according to various embodiments will be described in the following.

According to various embodiments, the bitmap may be extended by using a group ID (identifier). A group ID may either be attached to at the beginning or end of the bitmap. For example, to support up to 6000 STA, three groups may be defined with each group contains up to 2000 STA. A bitmap with three bits may be used to indicate whether a group appeared is present within a TIM IE. If the bit is set to one, then the bitmap corresponding to this group may appear in the TIM IE. The number of bitmap of different group may be more than one.

For this method, a compression scheme as described above may be applied to compress the bitmap for each group. The compressed bitmap may can be transmitted. A pre-defined bit may be used to indicate whether a bitmap is compressed or not.

According to various embodiments, devices and methods may be provided that may be used to compress the TIM bitmap for IEEE 802.11 networks. This may help to reduce the size of beacons transmitted by AP and may therefore save both radio resource and energy.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A compression device comprising:
a subset determination circuit configured to determine a subset of a traffic indication map, the traffic indication map comprising a plurality of bits, each bit indicating whether data to be transmitted to a respective pre-determined radio communication terminal is present in an access point;
a pre-determined bit value determination circuit configured to determine whether the subset comprises a bit of a pre-determined bit value; and
a compressed string generation circuit configured to insert, if the subset comprises a bit of the pre-determined bit value, into a compressed string the subset and an indicator indicating that the subset comprises a bit of the pre-determined bit value, and further configured to insert, if the subset does not comprise a bit of the pre-determined bit value, into the compressed string an indicator indicating that the subset does not comprise a bit of the pre-determined bit value,
wherein the compression device is further configured to perform compression of the indicators using the subset determination circuit, the pre-determined bit value determination circuit, and the compressed string generation circuit.

2. The compression device of claim 1,
wherein the indicator indicating that the subset comprises a bit of the pre-determined bit value comprises a bit of a pre-determined first bit value, and
wherein the indicator indicating that the subset does not comprise a bit of the pre-determined bit value comprises a bit of a pre-determined second bit value.

3. The compression device of claim 1,
wherein the compression device is further configured to process a plurality of subsets of the traffic indication map using the subset determination circuit, the pre-determined bit value determination circuit, and the compressed string generation circuit.

4. A compression method comprising:
- determining a subset of a traffic indication map, the traffic indication map comprising a plurality of bits, each bit indicating whether data to be transmitted to a respective pre-determined radio communication terminal is present in an access point;
- determining whether the subset comprises a bit of a pre-determined bit value;
- inserting, if the subset comprises a bit of the pre-determined bit value, into a compressed string the subset and an indicator indicating that the subset comprises a bit of the pre-determined bit value, and inserting, if the subset does not comprise a bit of the pre-determined bit value, into the compressed string an indicator indicating that the subset does not comprise a bit of the pre-determined bit value; and
- performing compression of the indicators using the subset determination, the pre-determined bit value determination, and the compressed string generation.

5. The compression method of claim 4,
- wherein the indicator indicating that the subset comprises a bit of the pre-determined bit value comprises a bit of a pre-determined first bit value, and
- wherein the indicator indicating that the subset does not comprise a bit of the pre-determined bit value comprises a bit of a pre-determined second bit value.

6. The compression method of claim 4, further comprising:
- processing a plurality of subsets of the traffic indication map using the subset determination, the pre-determined bit value determination, and the compressed string generation.

7. The compression device of claim 1,
- wherein the predetermined bit value is one.

8. The compression device of claim 1,
- wherein the compressed string generation circuit is configured to insert into the compressed string only an indicator indicating that the subset does not include a bit of the pre-determined bit value, if the subset does not include a bit of the pre-determined bit value.

9. The compression device of claim 1,
- wherein the compressed string generation circuit is configured to generate the compressed string free of the subset, if the subset does not include a bit of the pre-determined bit value.

10. The compression method of claim 4, further comprising:
- determining whether the subset includes a plurality of bits following a pre-determined pattern.

11. The compression method of claim 4, further comprising:
- inserting into the compressed string only an indicator indicating that the subset does not include a bit of the pre-determined bit value, if the subset does not include a bit of the pre-determined bit value.

12. The compression method of claim 4, further comprising:
- generating the compressed string free of the subset, if the subset does not include a bit of the pre-determined bit value.

\* \* \* \* \*